United States Patent
Deng

(10) Patent No.: US 9,684,842 B2
(45) Date of Patent: Jun. 20, 2017

(54) METHODS AND APPARATUS TO EXTRACT TEXT FROM IMAGED DOCUMENTS

(71) Applicant: The Nielsen Company (US), LLC, New York, NY (US)

(72) Inventor: Kevin Keqiang Deng, Safety Harbor, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 14/927,014

(22) Filed: Oct. 29, 2015

(65) Prior Publication Data

US 2017/0124413 A1    May 4, 2017

(51) Int. Cl.
G06K 9/00 (2006.01)
G06K 9/34 (2006.01)
G06K 9/62 (2006.01)
G06K 9/64 (2006.01)
G06K 9/03 (2006.01)

(52) U.S. Cl.
CPC ............ G06K 9/344 (2013.01); G06K 9/033 (2013.01); G06K 9/6221 (2013.01); G06K 9/64 (2013.01); G06K 2209/01 (2013.01)

(58) Field of Classification Search
CPC ...... G06K 9/344; G06K 9/033; G06K 9/6221; G06K 9/64; G06K 9/3275; G06K 9/3283; G06K 9/348; G06K 9/42; G06K 9/6203; G06K 9/03; G06K 9/6202; G06K 9/6218–9/6265; G06K 2209/01; G06K 2209/011; G06K 2209/013; G06K 2209/015; H04N 1/00331
See application file for complete search history.

(56) References Cited

U.S. PATENT DOCUMENTS

| | | | |
|---|---|---|---|
| 5,321,773 | A | 6/1994 | Kopec et al. |
| 5,455,875 | A | 10/1995 | Chevion et al. |
| 5,764,799 | A | 6/1998 | Hong et al. |
| 6,915,011 | B2 | 7/2005 | Loui et al. |
| 7,383,258 | B2 | 6/2008 | Harik et al. |
| 8,131,085 | B2 | 3/2012 | Vincent et al. |
| 8,285,057 | B2 | 10/2012 | Sarkar |
| 8,331,739 | B1 | 12/2012 | Abdulkader et al. |
| 8,340,429 | B2 | 12/2012 | Kompalli et al. |

(Continued)

*Primary Examiner* — Jose Couso
(74) *Attorney, Agent, or Firm* — Hanley, Flight & Zimmerman, LLC

(57) ABSTRACT

Methods and apparatus to extract text from imaged documents are disclosed. Example methods include segmenting an image of a document into localized sub-images corresponding to individual characters in the document. The example methods further include grouping respective ones of the sub-images into a cluster based on a visual correlation of the respective ones of the sub-images to a reference sub-image. The visual correlation between the reference sub-image and the respective ones of the sub-images grouped into the cluster exceeding a correlation threshold. The example methods also include identifying a designated character for the cluster based on the sub-images grouped into the cluster. The example methods further include associating the designated character with locations in the image of the document associated with the respective ones of the sub-images grouped into the cluster.

20 Claims, 11 Drawing Sheets

(56) References Cited

U.S. PATENT DOCUMENTS

| | | | |
|---|---|---|---|
| 8,391,609 B2 * | 3/2013 | Huntington | G06K 9/00865 348/222.1 |
| 8,831,329 B1 | 9/2014 | Kumar et al. | |
| 8,831,361 B2 | 9/2014 | Pintsov | |
| 8,861,861 B2 | 10/2014 | Barret et al. | |
| 8,965,127 B2 | 2/2015 | Wu et al. | |
| 9,384,389 B1 * | 7/2016 | Sankaranarayanan | G06K 9/00456 |
| 2012/0078682 A1 | 3/2012 | Pinsley et al. | |
| 2013/0294690 A1 | 11/2013 | Urbach et al. | |
| 2014/0181155 A1 | 6/2014 | Homsany | |
| 2015/0227904 A1 | 8/2015 | Lawson et al. | |

* cited by examiner

METHODS AND APPARATUS TO EXTRACT TEXT FROM IMAGED DOCUMENTS

FIELD OF THE DISCLOSURE

This disclosure relates generally to text extraction, and, more particularly, to methods and apparatus to extract text from imaged documents.

BACKGROUND

There are many different circumstances and reasons for which individuals, businesses, and/or other entities may desire to convert images of text in a document (or other item) into machine-encoded text. For example, conversion of imaged text to machine-encoded text enables the text to be electronically edited, to be searched, to be organized and/or stored in a database, etc. The identification and encoding of imaged text is referred to herein as text extraction.

DETAILED DESCRIPTION

Figure 1:
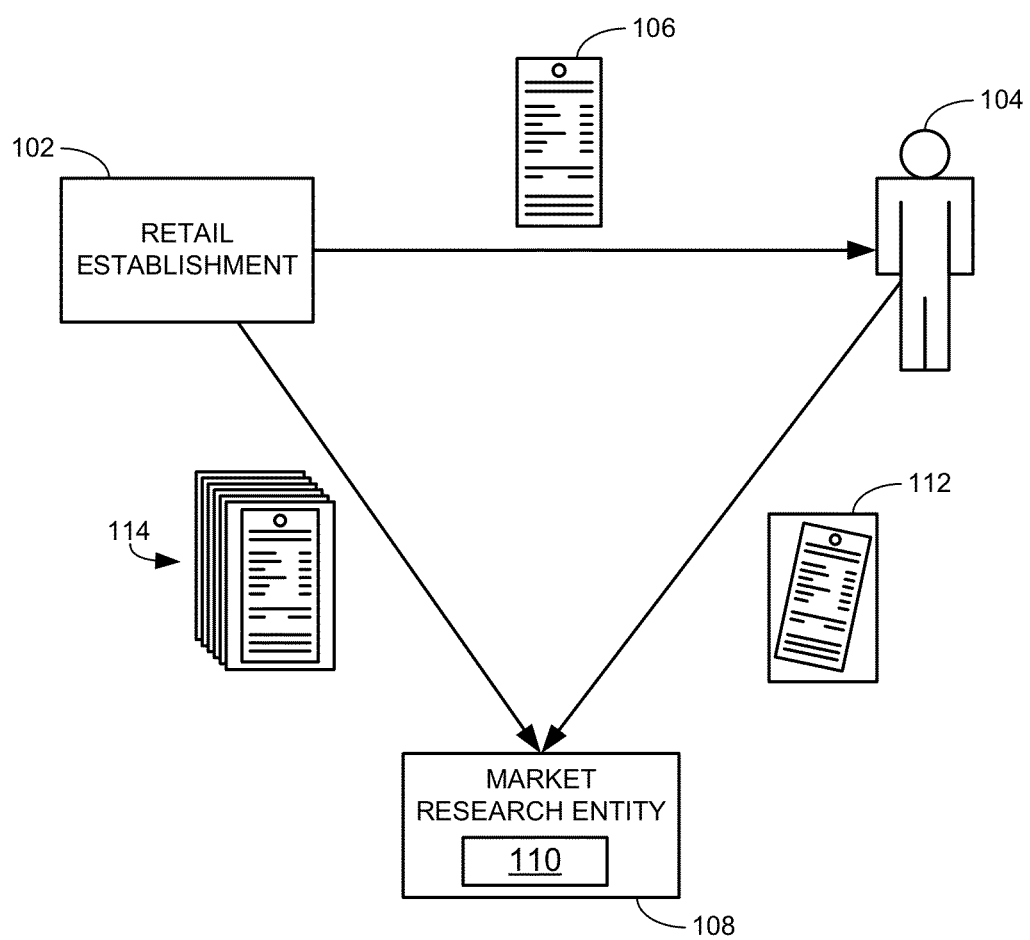
FIG. 1 is a schematic illustration of an example environment including an example data processing facility implemented in accordance with the teachings of this disclosure.

Manual text extraction involves a human reviewing an image of a document (or a paper copy of the document) and manually typing the text. Manual extraction has a high level of accuracy but can be cost prohibitive and time consuming. Optical character recognition (OCR) is a technique to automatically detect, identify, and encode image-based text documents using a computer. While using OCR to extract text is typically faster and cheaper than manual extraction, OCR is less accurate and more prone to error. Furthermore, the accuracy of OCR techniques diminishes when the original text to be extracted is printed poorly, or the quality of the image of the original text is low. For example, while an OCR engine may be able to recognize the clearly printed text of a magazine article imaged using a flatbed scanner with a relatively high level of accuracy, the same OCR engine may be much less accurate in recognizing the text on a receipt printed using a low quality point-of-sale printer and imaged using a handheld camera under poor lighting conditions, especially if the receipt has been crumpled and does not lay flat.

Thus, in some examples, where relatively high levels of accuracy are desired, OCR is insufficient by itself. It may be possible to perform OCR followed by a manual review to correct for errors. However, in many such instances, the manual review may be just as costly and/or time consuming as direct manual extraction, and/or the benefits may be marginal. Furthermore, while computer-based text extraction (e.g., using OCR) will likely improve with time as the technology advances, there will still likely be at least some errors that may necessitate manual review. Accordingly, there is a need to reduce the amount of manual review during text extraction regardless of the accuracy of OCR.

Examples disclosed herein increase the accuracy and/or efficiency of text extraction by exploiting the visual similarities between common individual characters (e.g., letters, numbers, or symbols) within the imaged text to be recognized. For example, a lower case letter "h" in a collection of text is more visually similar to other instances of the lower case letter "h" in the text than to, for example, an upper case letter "T" (or any other character) in the text. Based on this fact, the characters in the text can be grouped into clusters of visually similar characters. More particularly, in some examples, imaged text is segmented into smaller localized sub-images corresponding to individual characters of the text and then the sub-images are compared and grouped into clusters accordingly. For example, a group of sub-images of characters that are visually correlated with the letter "h" will be in one cluster, while another group of sub-images of characters that are visually correlated with the letter "T" will be in another cluster, and so forth. While some different characters may potentially be grouped together because of a similarity in appearance (e.g., the capital letter "I", the lower case letter "l", and the number "1"), most clusters will include sub-images corresponding to substantially only one particular character because each character is sufficiently different in appearance to be distinguished from other characters.

In some instances, there may be slight differences between any two sub-images corresponding to the same character because of, for example, imperfections in the printing of the text, imperfections in the imaging of the text and/or imperfections in the sub-images forming. Accordingly, in some examples, sub-images are grouped in clusters based on having a visual correlation above a certain threshold to allow for small variation between any two sub-images corresponding to the same character. However, in some examples, the imperfections in printing or imaging of the text may result in two sub-images corresponding to the same character being sufficiently different in appearance as to be grouped into different clusters. For example, the upper part of the stem or ascender in one particular letter "h" may be underprinted (e.g., faded, incomplete, or entirely missing), another letter "h" may be underprinted on its curved portion or shoulder, while a third letter "h" may have a streak or line running through it (created by residual ink on a printhead of the printer). Although each of these letters correspond to the same character (a lower case letter "h"), because of imperfections in their printing, the visual correlation between a sub-images of any two of the characters may not exceed the specified threshold such that each sub-image is placed in its own cluster. Thus, in some examples, there may be multiple clusters corresponding to the same character. That is, while each cluster contains sub-images specific to substantially only a single particular character, the total number of clusters of sub-images may exceed the total number of actually different characters in an imaged document being analyzed in accordance with the teachings of this disclosure.

In accordance with the teachings disclosed herein, the grouping of sub-images into clusters described above is based on an image-based visual comparison of the sub-images. As such, although the clusters correspond to a particular character, the identification of the particular character for the cluster may not be specified (e.g., not yet machine-encoded). However, because each cluster of sub-images corresponds to a particular character, identifying the character in a single sub-image representative of the cluster can be used to identify the character corresponding to every one of the sub-images in the cluster. The character identified as corresponding to the sub-images in a particular cluster is referred to herein as the designated character for the cluster. For example, assuming an average of 5 letters per word, a 1000 word document will contain about 5000 characters (not including punctuation symbols). In such an example, there may be dozens, if not hundreds, of instances of a lower case letter "h" among the 5000 characters. If all instances of the letter "h" are grouped into a single cluster, then the identification of the letter "h" as the designated character for the cluster from a single representative sub-image can be applied to all of the sub-images in the cluster. Of course, as described above, it is possible that some instances of the letter "h" will be sufficiently different in appearance such that the corresponding sub-images will be grouped into separate clusters. However, the number of clusters corresponding to the letter "h" is still likely much less than the total number of instances of the letter "h" in the imaged document. By contrast, entirely manual text extraction (without using an OCR engine) would require a human reviewer to identify and type all instances of the letter h (as well as every other one of the 5000 characters plus any punctuation).

More generally, the total number of clusters of sub-images to be identified to encode an imaged document correspond to the total number of unique characters used in the document and the number of different clusters into which each unique character may be divided based on variation in the appearance of different instances of the particular character (e.g., based on different fonts used, printing errors of ones of the characters, and/or errors arising from the image capturing of the document or text to be analyzed). For example, most texts in the English language include a maximum of 94 unique characters (available on a standard keyboard) corresponding to 26 upper case letters, 26 lower case letters, 10 digits, and 32 symbols. If each character may differ in appearance to cause it to be separated into different clusters a maximum of N different ways, then the maximum number of potentially different clusters from any particular imaged text will be N×94. Assuming N (the maximum number of different clusters into which a particular character may be separated into) is equal to 10, the total number of clusters for any imaged text will be no more than 940 clusters (10×94). Thus, utilizing the clusters disclosed herein, the entire 5000 character document referred to above can be encoded by a human reviewer (without using an OCR engine) with the reviewer making at most 940 character identifications, which are then be propagated throughout the entire text, rather than individually identifying all 5000 characters, as well as the associated punctuation using traditional manual text extraction approaches. In some instances, the total number of character identifications may be significantly less because it is unlikely that the text includes all 94 potential characters, and some characters (e.g., a period or comma) are likely to have relatively few ways (much less than N) in which they may appear, thereby resulting in fewer clusters.

The advantage of grouping sub-images into clusters based on similar appearance before identifying the corresponding characters is made further apparent when the imaged text contains even more characters. For example, if a document is ten times longer than in the example above (included approximately 50,000 characters), there would still only be 940 clusters of sub-images to identify the corresponding cluster (e.g., assuming the maximum number of clusters for any given character is N=10, as in the example above). The difference between the clusters associated with the 5,000 character text versus the 50,000 character text is that the clusters in the 50,000 character text will contain more sub-images on average. From the view point of a human reviewer, there is no increase in time or cost to extract (encode) the characters for the longer text because the identification of a single sub-image representative of a cluster can be applied to every sub-image in the cluster regardless of the size of the cluster. Therefore, whether 5,000 characters or 50,000 characters need to be identified there is still only at most 940 (assuming N=10) character designations to be made.

The teachings disclosed herein can be extended to the text extraction of batches of documents. That is, while the imaged text may correspond to a single stand-alone document, the same principles apply when the imaged text corresponds to multiple separate and/or diverse documents. For example, assume that 100 documents each containing 50,000 characters are imaged and analyzed together. In such an example, though there is a total of 5,000,000 characters to be encoded, there will still only be approximately N×94 different clusters associated with particular characters to be identified to encode all 100 documents. While there is some time and/or cost involved in analyzing the 100 imaged documents to properly group the 5,000,000 sub-images corresponding to each of the 5,000,000 characters into corresponding clusters, this cost is negligible inasmuch as such analysis is automated as disclosed herein.

While the cost of manual text extraction is significantly reduced in the above example, the involvement of a human reviewer can be reduced significantly further when OCR techniques are implemented to identify the appropriate character to be designated for each cluster. Obviously, if OCR methods were perfectly accurate, then manual review would never be necessary. However, OCR techniques include some margin of error. While many characters may be accurately identified using OCR, there will typically be at least some characters that either cannot be identified or that are identified with a relatively low confidence. Accordingly, in some examples disclosed herein, the reliability of an identification of a designated character for a cluster using an OCR engine is analyzed. In some such examples, if the reliability of the identification of a designated character is relatively high (e.g., above a threshold), the designated character is automatically assigned to each sub-image in the cluster without manual review. On the other hand, if the reliability of the identification of the designated character is relatively low (e.g., below a threshold), the designated character identified by the OCR engine may be flagged for manual review and/or confirmation.

Using OCR techniques in combination with the clustering of sub-images as described above can greatly reduce the involvement of human reviewers beyond the time savings noted above for a purely manual review of clusters. For example, assume an OCR engine can identify designated characters with sufficient reliability (e.g., above a threshold) 80% of the time. In such a scenario, in the above example of the 940 potential clusters for which a designated character is to be identified, only 188 (20%) would need to be reviewed manually. This is a substantial improvement compared to 5,000,000 character identifications in a fully manual text extraction. While the 5,000,000 characters could be analyzed using traditional OCR methods to reduce a full manual review, because the accuracy of the OCR is only 80% in this example, that still leaves 1,000,000 (20% of 5,000,000) characters where the identification is not sufficiently reliable and, therefore, in need of manual review. Thus, grouping sub-images of characters into clusters of images having a similar appearance, as disclosed herein, has the potential to significantly reduce the cost of manual text extraction while still achieving desirable levels of accuracy regardless of whether OCR techniques are used. Of course, the use of OCR assists to further reduce the cost and/or need of human reviewers. In other words, while the teachings disclosed herein do not depend upon the accuracy, or even the use, of OCR techniques to reduce the involvement of human reviewers during text extraction, OCR techniques of any degree of accuracy can serve to further reduce the involvement of human reviewers. Thus, as OCR techniques are developed and improve over time, they can be immediately implemented in accordance with the teachings disclosed herein to further reduce the amount of involvement of human reviewers.

Additionally, in some examples, the manual identification of a designated character for a cluster of sub-images corresponding to a character that could not reliably be identified using OCR is saved in a database for future reference when additional documents are analyzed. That is, in addition to applying the teachings disclosed herein to one or more imaged documents at one particular time (e.g., a single batch), the manual identifications of designated characters in a cluster may be used to automatically identify a character designated for sub-images in a corresponding cluster analyzed at a later time. In other words, manual identification of a character designated for a particular sub-image can be applied to as many instances of similar sub-images (e.g., having the same appearance within a threshold) in as many different documents as there are to be analyzed, whether analyzed at the same time (e.g., in a single batch) or over a period of time (e.g., multiple successive batches).

An example method disclosed herein includes segmenting, with a processor, an image of a document into localized sub-images corresponding to individual characters in the document. The example method further includes grouping, with the processor, respective ones of the sub-images into a cluster based on a visual correlation of the respective ones of the sub-images to a reference sub-image. The visual correlation between the reference sub-image and the respective ones of the sub-images grouped into the cluster exceeding a correlation threshold. The example method also includes identifying, with the processor, a designated character for the cluster based on the sub-images grouped into the cluster. The example method further includes associating, with the processor, the designated character with locations in the image of the document associated with the respective ones of the sub-images grouped into the cluster.

An example apparatus includes an image analyzer, implemented via a processor, to segment an image of a document into localized sub-images corresponding to individual characters in the document, and group respective ones of the sub-images into a cluster based on a visual correlation of the respective ones of the sub-images to a reference sub-image. The visual correlation between the reference sub-image and the respective ones of the sub-images grouped into the cluster exceeds a correlation threshold. The example apparatus further includes a character identifier, implemented via the processor, to identify a designated character for the cluster based on the sub-images grouped into the cluster. The example apparatus also includes an encoded text generator, implemented via the processor, generator to associate the designated character with locations in the image of the document associated with the respective ones of the sub-images grouped into the cluster.

Example instructions that, when executed, cause a machine to at least segment an image of a document into localized sub-images corresponding to individual characters in the document. The example instructions further cause the machine to group respective ones of the sub-images into a cluster based on a visual correlation of the respective ones of the sub-images to a reference sub-image. The visual correlation between the reference sub-image and the respective ones of the sub-images grouped into the cluster exceeding a correlation threshold. The example instructions also cause the machine to identify a designated character for the cluster based on the sub-images grouped into the cluster. The example instructions also cause the machine to associate the designated character with locations in the image of the document associated with the respective ones of the sub-images grouped into the cluster.

FIG. 1 illustrates an example scenario in which the teachings disclosed herein may be implemented. In the illustrated example, a retail establishment 102 sells goods or services to a consumer 104. As part of the purchase, the retail establishment 102 may provide a receipt 106 to the consumer 104. In some examples, the consumer 104 is a consumer panelist of a market research panel. Consumer panelists are consumers 104 registered in panels maintained by a market research entity 108 to gather market data (e.g., concerning products purchased, quantities purchased, pricing, location of purchases, etc.) from panel members that can be tied to the demographic characteristic of the panel members. That is, the market research entity 108 enrolls people (e.g., the consumer panelist 104) that consent to being monitored and/or to otherwise provide feedback to the market research entity 108. During enrollment, the market research entity 108 receives demographic information from the enrolling people (e.g., the consumer panelist 104) so that subsequent correlations may be made between the market data associated with those panelists and different demographic markets. People may become panelists in any suitable manner such as, for example, via a telephone interview, by completing an online survey, etc. Additionally or alternatively, people may be contacted and/or enlisted using any desired methodology (e.g., random selection, statistical selection, phone solicitations, Internet advertisements, surveys, advertisements in shopping malls, product packaging, etc.).

In some examples, once a person enrolls as a consumer panelist, the market research entity 108 tracks and/or monitors the purchasing behavior of the consumer panelist by collecting copies of receipts (e.g., the receipt 106) at a data processing facility 110 where the receipts are processed and analyzed. In some examples, the panelist 104 is requested to capture an image 112 of the receipt 106 and forward the image to the data processing facility 110 of the market research entity 108. The image 112 may be captured and forwarded to the data processing facility 110 using any suitable means. For example, the panelist 104 may photograph the receipt 106 using a handheld device (e.g., tablet, smartphone, etc.) and then transmit the resulting image 112 to the data processing facility 110 (e.g., over a wireless cellular network). While taking a photograph of a receipt may be convenient for a consumer panelist 104, it poses potential challenges for subsequent text extraction as the image 112 captured by the consumer panelist 104 may be of poor quality because, for example, the receipt is not oriented properly relative to a field of view of the camera (e.g., as shown in the illustrated example, the receipt 106 in the image 112 is misoriented relative to the image 112), there may be poor lighting, the camera may have been out of focus, etc. In such situations, OCR techniques may have accuracy rates such that there may be an increased need to use human reviewers to achieve acceptable levels of accuracy. In other examples, the panelist 104 may scan the receipt 106 using a scanner and then transmit the resulting image 112 to the data processing facility 110 (e.g., over the Internet). In other examples, a purchase may be made online such that the receipt 106 is electronically generated (e.g., sent to the panelists 104 via email). In such examples, an electronic copy of the receipt may be forwarded to the data processing facility 110.

While only a single receipt 106 is shown in the illustrated example, the panelist 104 may image capture any number of receipts and forward them to the data processing facility 110. In some examples, there may be multiple receipts from the same retail establishment 102. In other examples, the panelist 104 may have made purchases from multiple different retail establishments and, thus, may provide copies of receipts from the retail establishments to the data processing facility 110. Furthermore, while only one panelist 104 is shown in FIG. 1, in some examples, multiple consumers may enroll as panelists and provide receipts received from the respective retail establishments at which the panelists make purchases. Thus, in some examples, the data processing facility 110 may receive multiple images of receipts originating from one or more retail establishments provided from one or more consumer panelists.

Additionally or alternatively, as shown in the illustrated example, the retail establishment 102 may directly provide copies or images 114 of consumer receipts to the data processing facility 110 regardless of whether the consumers are panelists. That is, the receipt images 114 may correspond to transactions entered into by the panelist 104 (and/or other panelists) as well as transactions entered into by other non-panelist consumers. Thus, in some examples, the data processing facility 110 may receive large batches of images of receipts from a particular retail establishment 102 for analysis and processing. Of course, in some instances, the retail establishment 102 may have access to receipt information in electronic form such that text extraction becomes unnecessary.

In some examples, whether receipt images are received from the panelist (e.g., the receipt image 112), from the retail establishment 102 (e.g., the receipt images 114), or both, the data processing facility 110 analyzes the receipts in the same manner based on grouping of sub-images corresponding to individual characters in the receipt images 112, 114 into clusters, identifying a designated character for each cluster, and applying the designated character to all of the sub-images in the corresponding cluster. While the data processing facility 110 can process a single receipt image at a time, in some examples, receipt images are analyzed in batches of more than one receipt to take advantage of economies of scale. For example, while a greater number of receipts in a batch results in a greater number of sub-images within any given cluster, the total number of clusters produced from the entire batch is likely to remain substantially the same regardless of the number of receipts in the batch. As such, the total number of designated characters to be identified for the batch may remain substantially consistent regardless of the size of the batch.

As more receipts are included in a particular batch for analysis, there is the likelihood that individual ones of the receipts will have unique printing errors and/or other aberrations from regularly printed text (e.g., random ink blotches) that will generate characters that are visually distinct from all other characters in the batch. Accordingly, in some examples, the total number of clusters in a larger batch may be somewhat higher than in a smaller batch. However, the additional clusters resulting from these aberrations are relatively minor compared to the efficiency gained by identifying all of the characters in the additional receipts (included in the larger batch) at the same time with other receipts.

More significantly, if multiple receipts within a batch are printed from different types of printers that use different fonts, there is a relatively high likelihood that many of the characters in one type of receipt (e.g., from a first type of printer with a first font) will be visually dissimilar from the characters of the another type of receipt (e.g., from a second type of printer with a second font). In such scenarios, each type of receipt may generate its own set of clusters that do not correspond to the characters of the other type of receipt such that combining the receipts into a single batch does not provide any significant efficiency over analyzing batches of each type of receipt separately. Accordingly, in some examples, different receipts are organized into different batches based on the type of printer and/or font used in the receipts. In some examples, batches of receipts are analyzed based on the business where the receipts originated (e.g., the retail establishment 102 issuing the receipt 106) on the assumption that a particular business is likely to use the same type of point-of-sale printer in generating all of its customer receipts. However, in other examples, the data processing facility 110 may analyze a variety of receipts from different sources in a single batch without distinguishing the source (e.g., when the panelist 104 provides a number of receipts from all the retail establishments visited by the panelist 104). An example manner of implementing the data processing facility is disclosed in further detail below in connection with FIG. 2. Although text extraction of receipt images 112, 114 are shown in FIG. 1, the teachings disclosed herein may be suitably adapted to extract (e.g., encode) text for any sort of digitally imaged text.

Figure 2:
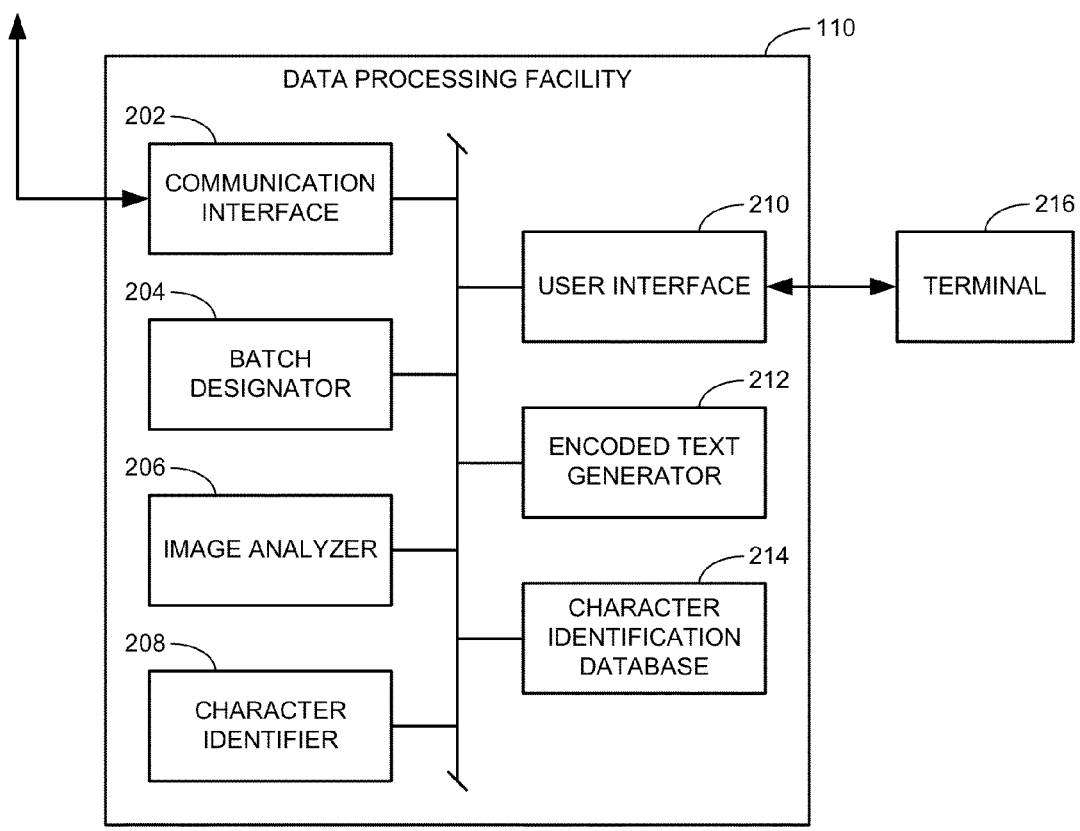
FIG. 2 is a block diagram of an example implementation of the example data processing facility of FIG. 1.

FIG. 2 is a block diagram of an example implementation of the example data processing facility 110 of FIG. 1. The example data processing facility 110 includes an example communication interface 202, an example batch designator 204, an example image analyzer 206, an example character identifier 208, an example user interface 210, an example encoded text generator 212, and an example character identification database 214.

While the teachings disclosed herein may be implemented to extract any sort of imaged text, for purposes of explanation, FIG. 2 is described in the context of performing text extraction on receipts received from consumer panelists and/or retail establishments as described above in connection with FIG. 1. Thus, in the illustrated example of FIG. 2, the data processing facility 110 is provided with the example communication interface 202 to communicate with the consumer panelists 104 and/or the retail establishment 102. In some examples, the communication interface 202 receives images of receipts (e.g., the images 112, 114) from the consumer panelist 104 and/or the retail establishment 102.

Further, in some examples, the communication interface 202 may transmit feedback and/or instructions to the panelist and/or the retail establishment in relation to the receipts previously collected (e.g., a report to the retail establishment on the marketing data processed from submitted the submitted receipt images 114) and/or future receipts to be collected (e.g., instructions for capturing and/or forwarding the receipt images).

In the illustrated example of FIG. 2, the data processing facility 110 is provided with the example batch designator 204 to designate a suitable batch in which receipts received by the communication interface 202 may be placed for batch analysis. In some examples, each transmission of receipt images 112, 114 from either the retail establishment 102 and/or the panelist 104 is designated as an individual batch. In other examples, receipts received over a period of time are collected into a single batch before being analyzed. In other examples, the batch designator 204 identifies an original source (e.g., the retail establishment issuing each receipt) corresponding to the receipt images 112, 114 and places receipts from different sources into different batches. In some examples, the batch designator 204 identifies the original source based on input from the retail establishment 102 and/or the panelist 104 providing the receipt images 112, 114. In other examples, the batch designator 204 identifies the original source based on an analysis of the receipt images (e.g., by detecting logos and/or trademarks on the receipts).

In the illustrated example of FIG. 2, the data processing facility 110 is provided with the example image analyzer 206 to identify or isolate localized sub-images corresponding to each character in the receipt images 112, 114 to be analyzed. The process of isolating individual characters within an imaged document such as the receipt images 112, 114 is referred to herein as segmentation. There are a number of known segmentation techniques. As one example, the image analyzer 206 may analyze each pixel within a receipt image to determine a most popular gray level (assuming the image is in grayscale), which corresponds to the background of the text. In some such examples, the image analyzer 206 then sets all pixels with a value within a specified range of the most popular gray level to a value of 0 (corresponding to white) and sets all other pixels to a value of 1 (corresponding to black), thus turning the image into a binary black and white image with the black pixels corresponding to the characters. In some such examples, the image analyzer 206 finds each connected component within the black and white image using a flood fill algorithm. In some examples, each connected component is treated as a separate character, assuming individual characters are separated from adjacent characters by white pixels. The image analyzer 206 may compute the boundary for each such component to determine the boundary for the character represented by the identified component. In some examples, where component boundaries are smaller and/or misaligned with the boundaries of adjacent components, the smaller bounded areas may be identified as corresponding to different parts of a single character (e.g., the dot and bar on a lower case letter "i" or two portions of a character separated by an underprinted portion) and group them together to form a boundary for the complete character. In some examples, computing the boundary for a component (corresponding to a particular character) includes determining the size of the component as well as the location of the component within the black and white image. In this manner, the location of each character is specified so that once the character is identified, the designated character can be applied to the proper location within the receipt image. The calculated boundaries for each component is then applied to the original receipt image 112, 114 (the same size and at the same location) to isolate sub-images of each character within each receipt image. Of course, the image analyzer 206 may use any other suitable segmentation technique in addition to or instead of the example described above to isolate sub-images corresponding to each character in the receipt images 112, 114.

In addition to segmenting receipt images 112, 114 into isolated sub-images, in some examples, the image analyzer 206 groups the sub-images into clusters based on an analysis of a visual comparison of the sub-images. In some examples, the image analyzer 206 groups two different sub-images into a common cluster when a visual correlation between the two sub-images exceeds a threshold. In some examples, the image analyzer 206 calculates the visual correlation between two sub-images by treating a first one of the sub-images as a reference sub-image and comparing the second sub-image to the first sub-image. An example process to calculate a visual correlation between two sub-images is described in connection with FIGS. 3-5.

Figure 3:
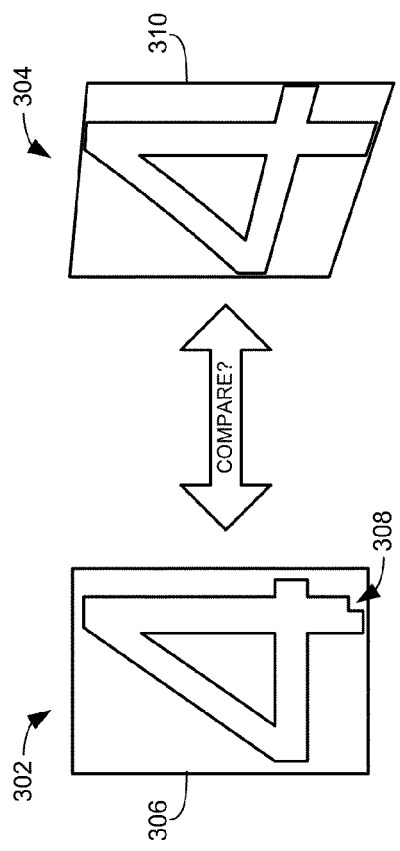
Figure 6:
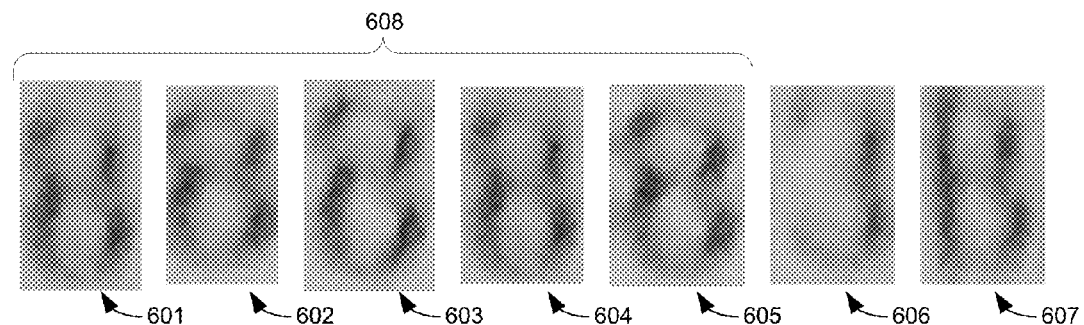
FIG. 6 shows example sub-images of characters isolated from an actual receipt.

In the illustrated example of FIG. 3, a first sub-image 302 (corresponding to the number "4") is the reference sub-image and is to be compared to a second sub-image 304 (also corresponding to the number 4). For purposes of explanation, the characters in the sub-images 302, 304 are represented by outline only. However, most characters are typically filled in when printed. Example sub-images of actual characters from an actual receipt are shown in FIG. 6. In the illustrated example of FIG. 3, the number "4" in the reference sub-image 302 is oriented upright as indicated by the rectangular boundary 306 but a bottom corner 308 is missing. In some examples, the missing corner 308 may be due to underprinting of that portion of the number "4". By contrast, the number "4" in the second image 304 is fully printed but is skewed in appearance as indicated by the non-rectangular shape of the boundary 310. In some examples, the irregular shape of the number "4" in the second sub-image 304 may be due to the image capturing process of the receipt from which the second sub-image 304 is taken. For example, the receipt may have been positioned at an angle relative to a field of view of a camera capturing the image of the receipt and/or the receipt may have been folded, creased, and/or crinkled when the image was taken resulting in distortion of certain ones of the characters.

Figure 4:
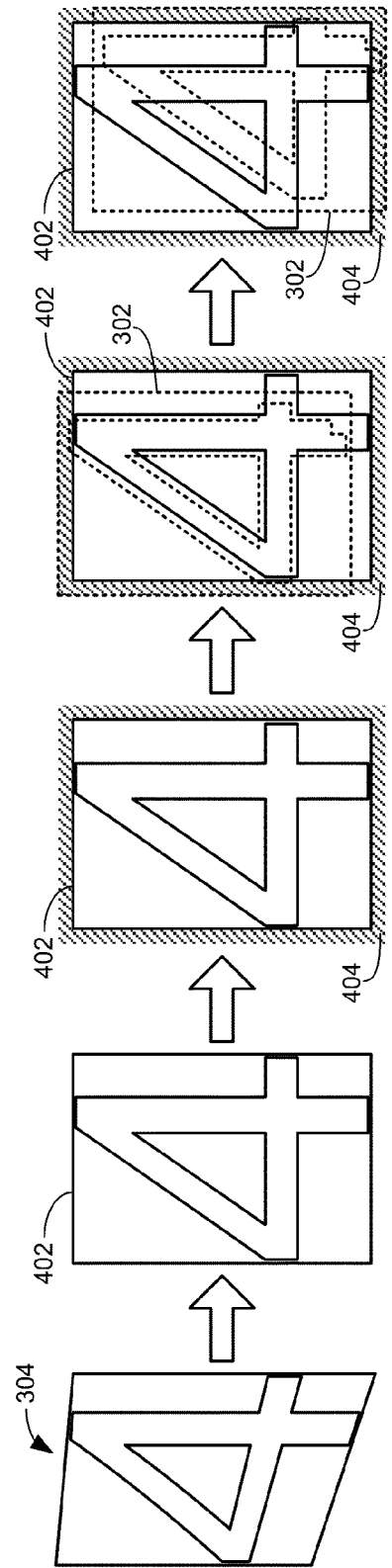

In some examples, to compare the two sub-images shown in FIG. 3, the image analyzer 206 first warps or transforms the second sub-image 304 to a transformed sub-image 402 as illustrated in FIG. 4. In some examples, the transformed sub-image 402 has a shape or spatial orientation generally corresponding to the first sub-image 302 (i.e., the reference sub-image to which the second sub-image is to be compared). Inasmuch as the character in the sub-images (the number "4") has not been identified, in some examples, the transformation is based on an analysis of the boundaries 306, 310 of the sub-images 302, 304 rather than any particular content within each sub-image.

Once the second sub-image 302 has been transformed to the transformed sub-image 402, the example image analyzer 206 adds a margin 404 of a specified number of pixels around the transformed sub-image 402. The margin 404 provides some padding or leeway to facilitate the comparison of the transformed sub-image 402 with the reference image 302 due to the possibility of the characters in each sub-image 302, 304 being in slightly different positions relative to their respective boundaries 306, 310. In some examples, the image analyzer 206 calculates a correlation value indicative of a level of similarity between the reference sub-image 302 and the transformed image 402 at each of a plurality of positions of the reference sub-image 302 relative to the transformed sub-image 402 within the area defined by the margin 404. For example, as shown in FIG. 4, in a first comparison 408, the reference sub-image 302 (represented in dotted lines) is positioned in the top left corner of the margin 404 whereas in a second comparison 410, the reference sub-image 302 is positioned in the bottom right corner of the margin 404.

In some examples, the image analyzer 206 calculates the correlation value for each relative position of the sub-images 302, 402 based on a pixel-by-pixel comparison of the images. In some examples, the correlation value is between 0 and 1, where 1 indicates that the sub-images are perfectly correlated (i.e., the sub-images are identical and exactly aligned). In the illustrated example, the sub-images 302, 402 are compared at each relative position (e.g., the images are shifted relative to each other one or more pixels at a time) within bounds defined by the margin 404. In some examples, the correlation value calculated at each relative position is compared and the highest correlation value is selected as the value representative of the visual correlation between the first sub-image 302 (i.e., the reference sub-image) and the second sub-image 304 (from which the transformed sub-image 402 was generated). As can be seen from the illustrated example, the number "4" in the reference sub-image 302 is higher than, and to the left of, the number "4" in the transformed sub-image 402 in the first comparison 408, whereas the number "4" in the reference sub-image 302 is lower than, and to the right of, the number "4" in the transformed sub-image 402 in the second comparison 410. As such, the correlation value for each of the first and second comparisons 408, 410 will be less than the correlation value corresponding to when the number "4" in the reference sub-image 302 is more aligned with the number "4" in the transformed sub-image 402 (e.g., somewhere between the two illustrated extremes).

Figure 5:
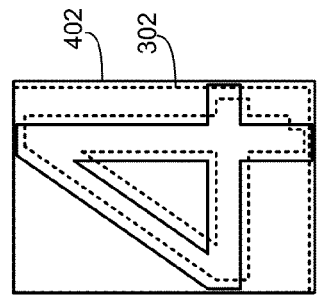
FIGS. 3-5 illustrates a comparison of two example sub-images of characters in accordance with the teachings disclosed herein

The margin 404 is provided around the transformed sub-image 402 to ensure that the different relative positions of the reference sub-image 302 and the transformed sub-image 402 surround a position of greatest alignment corresponding to the highest possible correlation value between the two images. For example, as shown in FIG. 5, without the margin 404, though the reference sub-image 302 is positioned in the upper left corner of the transformed sub-image 402, the number "4" in the reference sub-image 302 can never be positioned as high or as far to the left as the number "4" in the transformed sub-image 402. Thus, without the margin 404, the position of greatest alignment between the two sub-images 302, 402 would not be compared and a lower correlation value than when the number "4" in each image was substantially aligned would be assigned as the value for the visual correlation between the first and second sub-images 302, 304.

As noted above, in some examples, the image analyzer 206 determines whether two sub-images are sufficiently correlated to belong to the same cluster based on the visual correlation between them (determined based on the maximum correlation value calculated as described above). For example, two sub-images are grouped into the same cluster when the visual correlation between them exceeds a correlation threshold. The value of the correlation threshold may be any suitable value (e.g., 0.8, 0.85, 0.9, etc.). In the illustrated example shown in FIGS. 3-5, the visual correlation between the first sub-image 302 and the second sub-image 304 will be less than 1 because there are slight differences between the sub-images. However, they may be sufficiently similar in appearance (e.g., the visual correlation exceeds the correlation threshold) to be grouped in the same cluster. By contrast, if the second sub-image 304 corresponded to the number "3", it would be highly unlikely that the two sub-images would be grouped into the same cluster because the maximum calculated correlation value is unlikely to exceed the correlation threshold. To illustrate this point further, actual sub-images 601, 602, 603, 604, 605, 606, 607 are shown in FIG. 6. Based upon a threshold value of 0.85, the first five sub-images 601-605 (all corresponding to the number 8) are sufficiently similar in appearance to be grouped into a common cluster 608. By contrast, the sixth sub-image 606 (corresponding to the number 3) and the seventh sub-image 607 (corresponding to the letter B) are excluded from the cluster 608 because they do not correlate sufficiently with the sub-images 601-605 of the cluster 608.

In some examples, to identify different clusters, the image analyzer 206 compares each sub-image isolated within the imaged document being analyzed (e.g., the receipt images 112, 114 of FIG. 1). In some examples, to avoid redundancy, each additional sub-image is compared with only a single reference sub-image for each cluster that has already been identified. In some examples, the reference sub-image for a cluster is the first sub-image identified for a cluster. For example, if the sub-images 601-607 of FIG. 6 are analyzed in order from left to right. The first sub-image 601 would automatically be designated as the reference sub-image for a first cluster (e.g., the cluster 608). In some such examples, the image analyzer 206 then compares the second sub-image 602 to the first sub-image 601 to determine that the second sub-image belongs in the same cluster 608 as the first sub-image 603. In some examples, the third sub-image 603 may be compared to both the first and second sub-images 601, 602. However, in some examples, the third sub-image may be compared to the first sub-image 601, which is the designated reference sub-image for the cluster 608, but not to other sub-images, such as the second sub-image 602, included in the cluster. The same approach may apply for the fourth and fifth sub-images 604, 605. After the image analyzer 206 compares the sixth sub-image 606 to the first sub-image 601 and determines the sixth sub-image 606 does not belong in the first cluster 608, the image analyzer 206 may create a new cluster with the sixth sub-image 606 as the corresponding reference sub-image. In such examples, the seventh sub-image 607 would be compared to the first sub-image 601 (as the reference sub-image for the first cluster 608), and the sixth sub-image 606 (as the reference sub-image for a second cluster), and then be designated as the reference sub-image for a new cluster because of its visual differences from the first two clusters.

In some examples, the reference sub-image for a cluster corresponds to a composite of the sub-images generated as a running average of the sub-images already grouped into the cluster. In such examples, after the first two sub-images 601, 602 of FIG. 6 are grouped into a first cluster, the two sub-images 601, 602 are averaged to generate a composite sub-image to which the third sub-image 603 is compared. Thereafter, the composite sub-image is updated based on the pixel values of the third sub-image 603 and then compared with the fourth sub-image 604 and so on.

In addition to segmenting the receipt images 112, 114 into isolated sub-images and grouping the sub-images into respective clusters, in some examples, the image analyzer 206 analyzes the sub-images within a cluster after a character has been identified and designated for the cluster. As described more fully below, in some examples, after sub-images are grouped into clusters, the character represented by the sub-images is identified and designated for all sub-images in the cluster. This cluster-wide designation is based on the assumption that every sub-image grouped in a cluster corresponds to the same character. However, there are certain sets of characters that are known to have relatively minor visual differences that may give rise to the different characters being grouped in the same cluster. For example, a capital letter "P" and a capital letter "R" are similar in appearance except for the bottom right portion of the letter where the "R" includes a leg while the "P" does not. Accordingly, in some such examples, if the designated character for a cluster is identified as corresponding to either the capital letter "P" or the capital letter "R", the image analyzer 206 may analyze each sub-image within the cluster with a particular focus on the bottom right portion to determine whether a leg is present (corresponding to an "R") to either confirm the designated character is correct for the particular sub-image or correct the character designation for that particular sub-image as appropriate.

In some instances, the minor visual differences results from the nature of the characters themselves. For example, sets of characters that have relatively minor visual differences include the letters "R" and "P"; the number "6" and the letter "G"; the number "0" and the letter "O"; the number "1" and the letter "l", etc. In other scenarios, the minor visual differences may result from a character that is partially printed. For example, sets of characters that have relatively minor visual differences when one of the characters is partially printed include the numbers "8" and "3"; the letters "F" and "E", the letters "E" and "L"; the number "7" and the forward slash (/) symbol. Further in some examples, some sets of characters have relatively minor visual differences that arise from one of the characters being marred. For example, a marred forward slash (/) symbol may appear like the letter "X". Other character sets that may potentially be grouped into a single cluster may be identified and analyzed appropriately to reduce the likelihood of an incorrect character designation for any particular sub-image. In some examples, clusters corresponding to such characters are analyzed by focusing on a particular region of the sub-image as described in the "R/P" example above. Additionally or alternatively, in some examples, the image analyzer 206 may compare the individual sub-images of the cluster again to determine a visual correlation between each but apply a higher correlation threshold than when initially grouping the sub-images into the cluster.

In the illustrated example of FIG. 2, the data processing facility 110 is provided with the example character identifier 208 to identify a designated character for each cluster of sub-images generated by the image analyzer 206. In some examples, a single designated character is identified for an entire cluster regardless of the number of sub-images in the cluster. In this manner, a single character identification can be propagated and/or applied to many instances of the character corresponding to many different sub-images, thereby significantly increasing the efficiency with which imaged documents (e.g., the receipt images 112, 114) may be machine encoded.

In some examples, the character identifier 208 identifies the designated character for a cluster based on a single representative sub-image for the cluster. In some examples, the representative sub-image corresponds to the reference sub-image to which other sub-images were compared by the image analyzer 206 when determining that the sub-images belong in the same cluster. Of course, inasmuch as all of the sub-images within the cluster are visually similar, any of the sub-images within the cluster may be used as the representative sub-image. In some examples, the representative sub-image corresponds to a composite of some or all of the sub-images within the cluster. That is, in some examples, before identifying the designated character, the character identifier 208 generates a composite of the sub-images by averaging the pixel values at each corresponding pixel location within each of the sub-images included in the composite. In some examples, the corresponding pixel locations are based on an alignment of the sub-images corresponding to the relative position of the sub-images where the maximum correlation value was identified. In some situations, a composite sub-image generated in this manner reduces noise and/or blurriness that may appear within any particular sub-image of a cluster such that the composite sub-image is clearer and, thus, easier to analyze and/or recognize the character represented in the sub-image. In some examples, the image analyzer 206 may generate the composite sub-image while grouping the sub-images into clusters as described above. For example, as each additional sub-image for a cluster is identified, the composite sub-image is updated based on the newly identified sub-image. In some such examples, the updated composite sub-image is used as the reference sub-image for comparison to subsequent sub-images being analyzed for grouping into clusters.

In some examples, the character identifier 208 identifies the designated character for a cluster by prompting a human reviewer for feedback via the user interface 210 (e.g., in communication with any sort of computer terminal 216). That is, in some examples, the character identifier 208 displays the representative sub-image for the cluster to a human reviewer at the terminal 216 and prompts the human reviewer or confirm to identify the character represented in the sub-image. Thus, in some examples, the character identifier 208 identifies the designated character without using an optical character recognition (OCR) engine. In some such examples, the designated character for a cluster may be identified based on more than one representative sub-image provided to a human reviewer as a redundancy to verify the identification is accurate and/or that the cluster is limited to a single character. That is, in some examples, multiple ones of the sub-images within the cluster may be displayed to the reviewer in addition to the representative sub-image. Additionally or alternatively, in some examples, one or more of the sub-images within the cluster may be displayed to the reviewer in context by, for example, displaying the receipt images 112, 114 (or portions thereof) from which the sub-images were isolated. In some such examples, the sub-images may be identified or demarcated (e.g., highlighted, identified with a boundary, etc.) to assist the reviewer in identifying their location within the image. In some examples, the terminal 216 may be co-located with the data processing facility 110. In other examples, the terminal 216 may be located remotely from the data processing facility 110.

While the character identifier 208 may identify the designated character without using OCR (e.g., based purely on feedback from a human reviewer), in some examples, the character identifier 208 identifies the designated character based on an OCR analysis of the representative sub-image. Thus, in some examples, the character identifier 208 includes and/or implements an OCR engine. In some such examples, the example character identifier 208 determines a reliability of the designated character as determined by the OCR engine. That is, the character identifier 208 determines whether the character designation provided by the OCR engine is trustworthy. In some examples, if the designated character is reliable, the designated character is automatically assigned to each sub-image in the cluster without further analysis. However, in some examples where the designated character is not reliable (e.g., the designation is questionable), the character identifier 208 may seek confirmation of the designation from a human reviewer. For example, the character identifier 208 may provide the representative sub-image analyzed by the OCR engine along with the designated character identified by the OCR engine to a human reviewer at the terminal 216 via the user interface 210 and request the review to either confirm the designation (e.g., by pressing an enter key or space bar on a keyboard) or correct the designation (e.g., by pressing the appropriate key corresponding to the representative sub-image). In some examples, rather than seeking confirmation, the character identifier 208 may provide the representative sub-image and request the human reviewer to identify the character (e.g., by pressing the appropriate key) without providing the designated character as determined by the OCR engine. In some examples, confirmation may be sought for relatively reliable designated characters (but not sufficient to be automatically accepted), while direct identification from the reviewer may be sought for relatively less reliable character designations. In some examples, more than one representative sub-image for a particular cluster may be analyzed using OCR for redundancy to verify the identification of the designated character is accurate and improve the reliability of the designated character and/or to verify that the cluster is limited to a single character.

In some examples, the character identifier 208 determines whether a designated character is reliable based on whether one or more outputs of the OCR engine exceed corresponding thresholds. For example, an OCR engine may provide two outputs for each character identified: (1) the designation of the character and (2) a confidence value for the designation. In some examples, the confidence value is a number between 0 and 1, where 1 represents a confidence of 100%. In some examples, a character designation is reliable when the confidence value is above a confidence threshold. The confidence threshold may be any suitable value (e.g., 0.8, 0.85, 0.9, etc.).

In some examples, an OCR engine may be queried to output location information for each character identified. In some examples, the location information is indicative of the location of the boundaries of the designated character within the image from which the character was identified. That is, the location information output by the OCR engine is comparable to the location of the boundaries of the sub-images determined during segmentation except that the boundaries are defined with respect to the designated character. If the designated character corresponds to the actual character represented in the sub-image being analyzed, the location information output by the OCR engine should approximate the boundaries of the sub-image. However, if the OCR engine has designated the wrong character, there may be some difference between the location information output by the OCR engine and the boundaries of the sub-image. Accordingly, in some examples, the character identifier 208 calculates a location error value indicative of the amount of difference between the location information output by the OCR engine and the boundaries of the sub-image.

Figure 7:
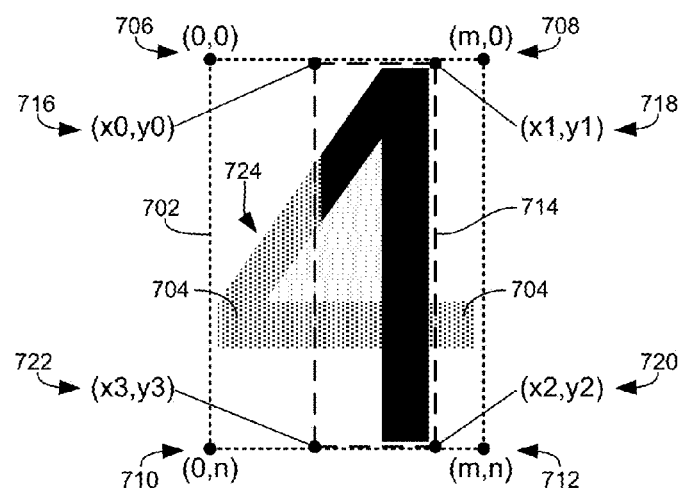
FIG. 7 illustrates an example sub-image of the number "4" misidentified as the number "1".

For example, FIG. 7 illustrates an example sub-image 702 corresponding to a number "4" having a portion 704 that is underprinted (lightly shaded in the illustrated example). The boundaries of the sub-image 702 are identified by the corners 706, 708, 710, 712 with corresponding location labels (0, 0), (m, 0), (0, n), and (m, n). In the illustrated example, the OCR engine mistakenly identified the designated character for the sub-image 702 as the number 1. The designated character has a designated character boundary 714 identified by corners 716, 718, 720, 722 with corresponding location labels (x0, y0), (x1, y1), (x2, y2), and (x3, y3). In some examples, the character identifier 208 calculates the location error value based on the total difference between the location of an area within a sub-image corresponding to the designated character (e.g., the area defined by the designated character boundary 714) and the boundary of the sub-image (e.g., the boundary of the sub-image 702). More specifically, in some examples, the character identifier 208 calculates the location error value based on the total difference in location between each of the corners 706, 708, 710, 712 of the sub-image 702 and the corresponding corners 716, 718, 720, 722 of the designated character boundary 714 in both the vertical and horizontal directions. Expressed mathematically with reference to FIG. 7, the location error value may be calculated as $|0-x0|+|0-y0|+|m-x1|+|0-y1|+|m-x2|+|n-y2|+|0-x3|+|n-y3|$. The maximum location error is equal to twice the sum of the width (m) and the height (n) of the sub-image 702. Accordingly, in some examples, the location error value is normalized to be between 0 and 1 by dividing the difference in location of the corners in the above calculation by the maximum location error. In some examples, a character designation is considered reliable when the location error value is below a location error threshold. The location error threshold may be any suitable value (e.g., 0.1, 0.15, 0.2, etc., when the location error value is normalized between 0 and 1). In some examples, the boundary for each sub-image is defined with a fixed width (m) and fixed height (y) such that the location error threshold may be defined at some value less than twice the sum of the width and the height without the need for normalizing the calculation between 0 and 1.

Additionally or alternatively, the character identifier 208 determines the reliability of a designated character based on the presence of foreground pixels outside the designated character boundary 714 but within the sub-image 702. In some examples, the foreground pixels are identified as pixels that have a pixel value that satisfies a threshold corresponding to pixels associated with the printed portion of a character within the sub-image rather than the background. For example, if the printed text is a dark color (e.g., black) on a background that is a light color (e.g., white), the foreground pixels correspond to pixels with a pixel value that satisfies a threshold indicative of dark pixels. Conversely, if the printed text is a light color (e.g., white) on a background that is a dark color (e.g., black), the foreground pixels correspond to pixels with a pixel value that satisfies a threshold indicative of light pixels. As a specific example, FIG. 7 shows a dark color for the printed text (e.g., black) and a light colored background (e.g., white). Assuming the underprinted portion 704 of the number 4 in the sub-image 702 in FIG. 7 is at least partially printed, an area 724 of the underprinted portion 704 will include foreground pixels (e.g., dark pixels) that are outside of the designated character boundary 714. Foreground pixels outside of the area corresponding to the designated character (i.e., the area defined by the designated character boundary 714) indicate that the area may not include the entire character represented in the sub-image. Accordingly, in such scenarios, the character identifier 208 may determine that the designated character is unreliable. Of course, in some examples, there may be stray pixels outside of the designated character boundary 714 that do not actually correspond to an actual character. In some such examples, the character identifier 208 may determine that the designated character is unreliable when an amount of the foreground pixels outside of the designated character boundary 714 (e.g., in absolute numbers and/or as a ratio to the entire area outside the designated character boundary 714) exceeds a threshold.

In some examples, the character identifier 208 may determine that the designated character is reliable when one or more of (1) the confidence value exceeds the confidence threshold, (2) the location error value is less than the location error threshold, and/or (3) the amount of foreground pixels outside the area corresponding to the designated character is less than a pixel threshold. In some examples, more than one of the above conditions must be satisfied before the character identifier 208 determines that the designated character is reliable. In some examples, all of the above conditions must be satisfied for a designated character to be reliable.

In some examples, certain characters, such as punctuation marks (e.g., a comma, a period, a dash, etc.), do not fill the entire space associated with the boundaries of a sub-image (which may be normalized to a fixed height and/or width based on the particular font being analyzed). In such examples, the area corresponding to the represented character (e.g., the designated character boundary 714 shown in FIG. 7) may be much smaller than the boundary of the sub-image resulting in relatively high location error values even when the correct character is identified. Accordingly, in some examples, the location error value is compared against an expected location error value for the designated character when the confidence value is above a suitable threshold. Of course, if the confidence value is low, then the designated character may be deemed unreliable regardless of the location error value.

In the illustrated example of FIG. 2, the data processing facility 110 is provided with the example encoded text generator 212 to generate machine-encoded text corresponding to the imaged text being analyzed (e.g., the receipt images 112, 114 of FIG. 1). In some examples, the encoded text generator 212 associates the designated character for a particular cluster (as determined by the character identifier 208) with the locations in the imaged text corresponding to the respective sub-images included in the cluster (as determined by the image analyzer 206). In this manner, the identification of a single designated character (e.g., based on the representative sub-image reviewed by a human and/or analyzed by an OCR engine) can be applied to multiple instances of the character within an imaged document so long as each instance of the character is sufficiently similar in appearance to be grouped into a common cluster. Where the clusters are large (which may result when multiple receipts are being analyzed), the savings in time for a human reviewer can be significant. Furthermore, where OCR identification of the designated character is reliable, there may be no need for a human reviewer at all.

In some examples, the encoded text generator 212 applies contextual based corrections to the extracted text. That is, in some examples, once all of the designated characters for each cluster have been associated with the corresponding sub-images of the imaged document (e.g., the receipt images 112, 114) such that all of the text has been encoded, the example encoded text generator 212 analyzes the text in context to identify any errors. For example, if a particular string of letters does not form a recognizable word (e.g., based on a dictionary lookup), the encoded text generator 212 may analyze each individual letter to determine whether it may have been identified incorrectly and could be changed to form a recognizable word. Similarly, if a string of characters includes all letters and one non-letter (e.g., a number of a symbol), the encoded text generator 212 may analyze the non-letter symbol to determine whether it should be a letter to form a recognizable word. As another example, the string of characters "10λ14/2015" substantially has the format of a date except that the letter "X" is in place of the first slash symbol (/). In some such examples, the encoded text generator 212 may identify the format of the string of characters and correct the letter "X" that was incorrectly identified. Analyzing the imaged documents in context in this manner enables any final errors to be detected and corrected before the encoded text generator 212 generates a complete machine-encoded text document corresponding to the receipt images 112, 114.

In the illustrated example of FIG. 2, the data processing facility 110 is provided with the example character identification database 214 to store the designated characters and/or representative sub-images of the respective clusters for subsequent reference. This is particularly advantageous when the designated character for a cluster was initially identified as unreliable such that a human reviewer had to confirm and/or specify the correct character. After the reviewer verifies the designated character, the verified designated character and associated representative sub-image may be stored in the character identification database 214. As such, if another sub-image arises at a later time that corresponds to the cluster associated with the designated character, the new sub-image can be directly associated with the designated character without having to again seek verification from the reviewer regarding that particular sub-image. Thus, the accuracy of the OCR analysis of sub-images can improve over time, thereby further reducing the need for manual review of imaged documents.

While an example manner of implementing the data processing facility 110 of FIG. 1 is illustrated in FIG. 2, one or more of the elements, processes and/or devices illustrated in FIG. 2 may be combined, divided, re-arranged, omitted, eliminated and/or implemented in any other way. Further, the example communication interface 202, the example batch designator 204, the example image analyzer 206, the example character identifier 208, the example user interface 210, the example encoded text generator 212, the example character identification database 214, and/or, more generally, the example data processing facility 110 of FIG. 1 may be implemented by hardware, software, firmware and/or any combination of hardware, software and/or firmware. Thus, for example, any of the example communication interface 202, the example batch designator 204, the example image analyzer 206, the example character identifier 208, the example user interface 210, the example encoded text generator 212, the example character identification database 214, and/or, more generally, the example data processing facility 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication interface 202, the example batch designator 204, the example image analyzer 206, the example character identifier 208, the example user interface 210, the example encoded text generator 212, and/or the example character identification database 214 is/are hereby expressly defined to include a tangible computer readable storage device or storage disk such as a memory, a digital versatile disk (DVD), a compact disk (CD), a Blu-ray disk, etc. storing the software and/or firmware. Further still, the example data processing facility 110 of FIG. 1 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example data processing facility 110 of FIGS. 1 and/or 2 are shown in FIGS. 8-13. In this example, the machine readable instructions comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 8-13, many other methods of implementing the example data processing facility 110 may alternatively be used. For example, the order of execution of the blocks may be changed, and/or some of the blocks described may be changed, eliminated, or combined.

As mentioned above, the example processes of FIGS. 8-13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 8-13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 8:
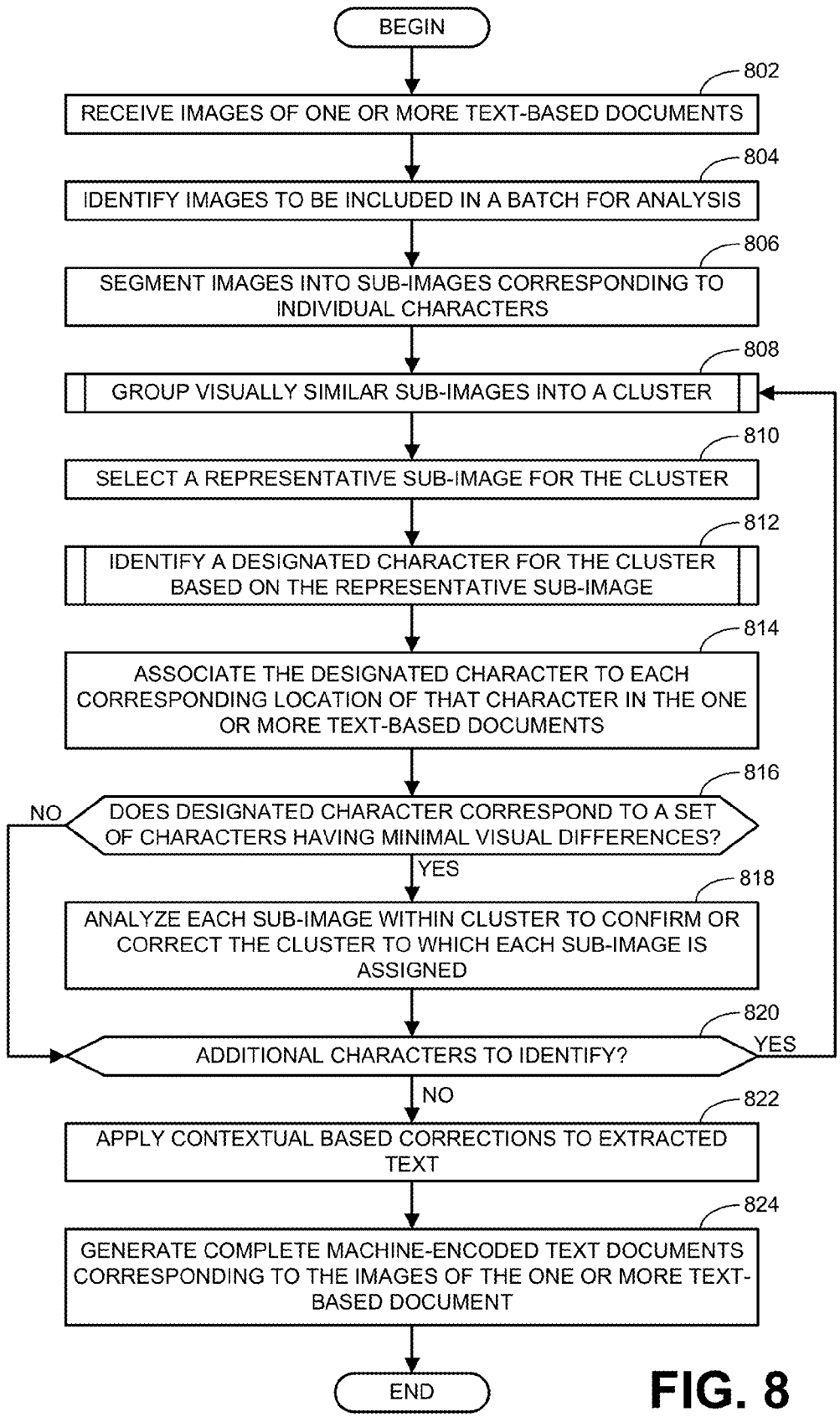
FIGS. 8-13 are flowcharts representative of example machine readable instructions that may be executed to implement the example data processing facility of FIGS. 1 and/or 2.

Turning in detail to the flowcharts, the example program of FIG. 8 begins at block 802 where the example communication interface 202 receives images of one or more text-based document (e.g., the receipt images 112, 114 of FIG. 1). At block 804, the example batch designator 204 identifies the images to be included in a batch for analysis. In some examples, all of the received images are included in a single batch. In other examples, the images may be separated into separate batches based on, for example, different originating sources (e.g., different retail establishments where the text-based documents originated). At block 806, the example image analyzer 206 segments the images into sub-images corresponding to individual characters. At block 808, the example image analyzer 206 groups visually similar sub-images into a cluster. Additional detail regarding the implementation of block 808 is provided below in connection with FIG. 9.

At block 810, the example character identifier 208 selects a representative sub-image for the cluster. In some examples, the representative sub-image corresponds to one of the sub-images in the cluster. In some examples, the representative sub-image corresponding to a composite sub-image of multiple ones of the sub-images within the cluster. At block 812, the example character identifier 208 identifies a designated character for the cluster based on the representative sub-image for the cluster. Additional detail regarding the implementation of block 812 is provided below in connection with FIG. 11. At block 814, the example encoded text generator 212 associates the designated character to each corresponding location of that character in the images of the one or more text-based documents. In some examples, the corresponding location to which the designated character is associated corresponds to the location within the one or more documents of each sub-image grouped in the cluster.

At block 816, the example encoded text generator 212 determines whether the designated character corresponds to a set of characters having minimal visual differences and, thus, is a character that has a relatively high likelihood of being mistaken for a different character. If the example encoded text generator 212 determines that the designated character corresponds to a set of characters having minimal visual differences, control advances to block 818 where the example encoded text generator 212 analyzes each sub-image within the cluster to confirm or correct the cluster to which each sub-image is assigned. Control then advances to block 820. If the example encoded text generator 212 determines that the designated character does not correspond to a set of characters having minimal visual differences (block 816), control advances directly to block 820.

At block 820, the example encoded text generator 212 determines whether there are additional characters to identify. If so, control returns to block 808. Otherwise, control advances to block 822 where the example encoded text generator 212 applies contextual based corrections to the extracted text. At block 824, the example encoded text generator 212 generates complete machine encoded text documents corresponding to the images of the one or more text-based documents, whereupon the example program of FIG. 8 ends.

As mentioned above, FIG. 9 illustrates an example program to implement block 808 of FIG. 8 to group visually similar sub-images into a cluster. The example program begins at block 902 where the example image analyzer 206 retrieves a first sub-image assigned to a first cluster to be a reference image. At block 904, the example image analyzer 206, identifies another sub-image not previously assigned to a cluster. At block 906, the example image analyzer 206 calculates a visual correlation between the identified sub-image and the reference sub-image for the cluster. Additional detail regarding the implementation of block 906 is provided below in connection with FIG. 10.

At block 908, the example image analyzer 206 determines whether the visual correlation satisfies (e.g., is greater than or equal to) a correlation threshold. If not, control advances to block 910 where the example image analyzer 206 determines whether there is another existing cluster to be examined. If there is another existing cluster, control returns to block 906 to calculate a visual correlation between the identified sub-image and a reference sub-image for the other existing cluster. If the example image analyzer 206 determines that there are no other existing clusters (block 910), control advances to block 912 where the example image analyzer 206 assigns the identified sub-image to a new cluster, whereupon control advances to block 916 discussed below. Control then advances to block 916 where the example image analyzer 206 determines whether there is another sub-image that has not previously been assigned to a cluster. If so, control returns to block 904 to repeat the process for another identified sub-image. Otherwise, the example program of FIG. 9 ends and returns to complete the example program of FIG. 8.

Returning to block 908, if the example image analyzer 206 determines that the visual correlation does satisfy the correlation threshold, control advances to block 914 where the example image analyzer 206 assigns the identified sub-image to the existing cluster. Thereafter, control advances to block 916 to either repeat the process for another sub-image or ends and returns to complete the example program of FIG. 8.

Figure 9:
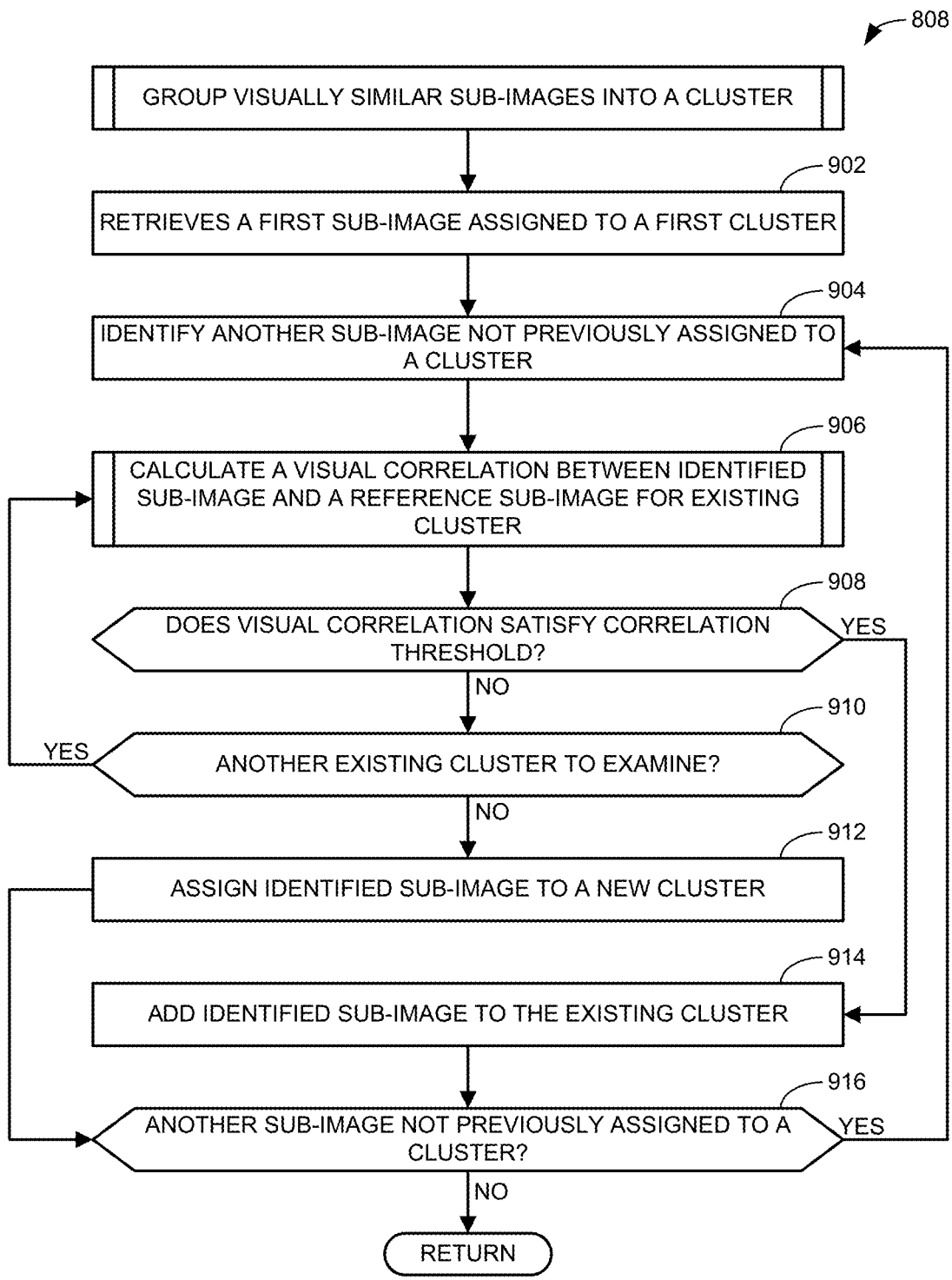
Figure 10:
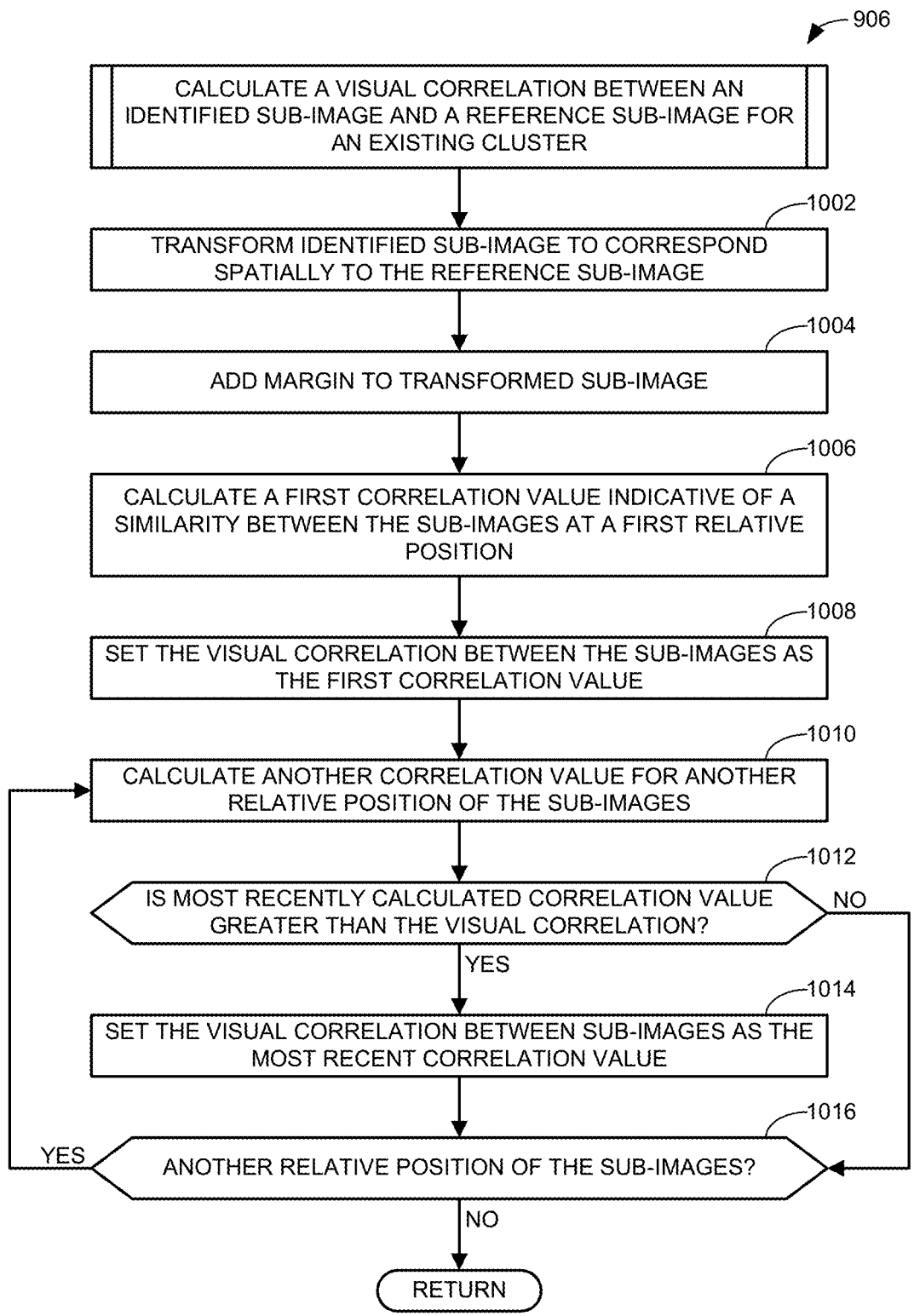

As mentioned above, FIG. 10 illustrates an example program to implement block 906 of FIG. 9 to calculate a visual correlation value between an identified sub-image and a reference sub-image for an existing cluster. The example program begins at block 1002 where the example image analyzer 206 transforms the identified sub-image to correspond spatially to the reference sub-image. At block 1004, the example image analyzer 206 adds a margin to the transformed sub-image. At block 1006, the example image analyzer 206 calculates a first correlation value indicative of a similarity between the sub-images at a first relative position. At block 1008, the example image analyzer 206 sets the visual correlation between the sub-images as the first correlation value.

At block 1010, the example image analyzer 206 calculates another correlation value for another relative position of the sub-images. At block 1012, the example image analyzer 206 determines whether the most recently calculated correlation value is greater than the visual correlation. If so, control advances to block 1014 where the example image analyzer 206 sets the visual correlation between the sub-images as the most recent correlation value. Control then advances to block 1016 where the example image analyzer 206 determines whether there is another relative position of the sub-images. If so, control returns to block 1010 to repeat the process for the other relative position. Otherwise, the example process ends and returns to complete the example program of FIG. 9. Returning to block 1012, if the example image analyzer 206 determines that the most recently calculated correlation value is not greater than the visual correlation, control advances directly to block 1016.

As mentioned above, FIG. 11 illustrates an example program to implement block 812 of FIG. 8 to identify a designated character for a cluster based on a representative sub-image for the cluster. The example program begins at block 1102 where the example character identifier 208 determines whether to use an optical character recognition (OCR) engine. If so, control advances to block 1104 where the example character identifier 208 identifies the designated character for the cluster based on an OCR analysis of the representative sub-image for the cluster. At block 1106, the example character identifier 208 analyzes the OCR outputs to determine a reliability of the designated character. Additional detail regarding the implementation of block 1106 is provided below in connection with FIG. 12.

At block 1108, the example character identifier 208 determines whether the designated character is reliable. If so, the example program of FIG. 11 ends and returns to complete the example program of FIG. 8 because the designated character is automatically accepted for the cluster. However, if the example character identifier 208 determines that the designated character is not reliable (block 1108), control advances to block 1110. At block 1110, the example character identifier 208 determines whether the representative sub-image corresponds to an archived cluster (e.g., stored in the character identification database 214). If so, control advances to block 1112 where the example character identifier 208 identifies the designated character as corresponding to the designated character for the archived cluster, whereupon the example program of FIG. 11 ends and returns to complete the example program of FIG. 8.

Returning to block 1102, if the example character identifier 208 determines not to use an OCR engine, control advances to block 1114 where the example character identifier 208 retrieves user-input to identify the designated character for the cluster. Additional detail regarding the implementation of block 1114 is provided below in connection with FIG. 13. At block 1116, the example character identification database 214 stores the user-input identification of the designated character for the cluster, whereupon the example program of FIG. 11 ends and returns to complete the example program of FIG. 8. Returning to block 1110, if the example character identifier 208 determines that the representative sub-image does not correspond to an archived cluster, control advances to block 1114 to proceed as outlined above.

Figure 11:
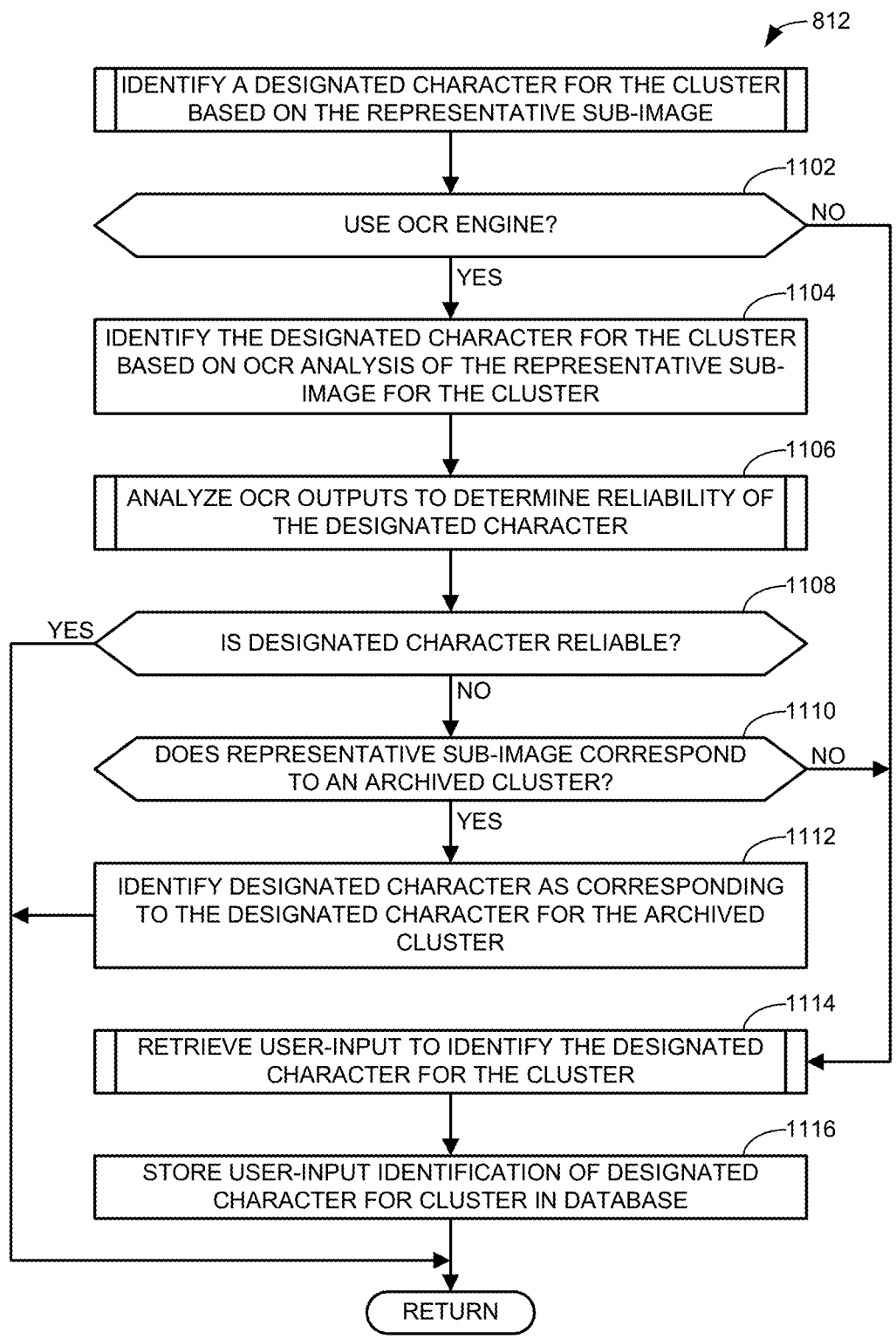
Figure 12:
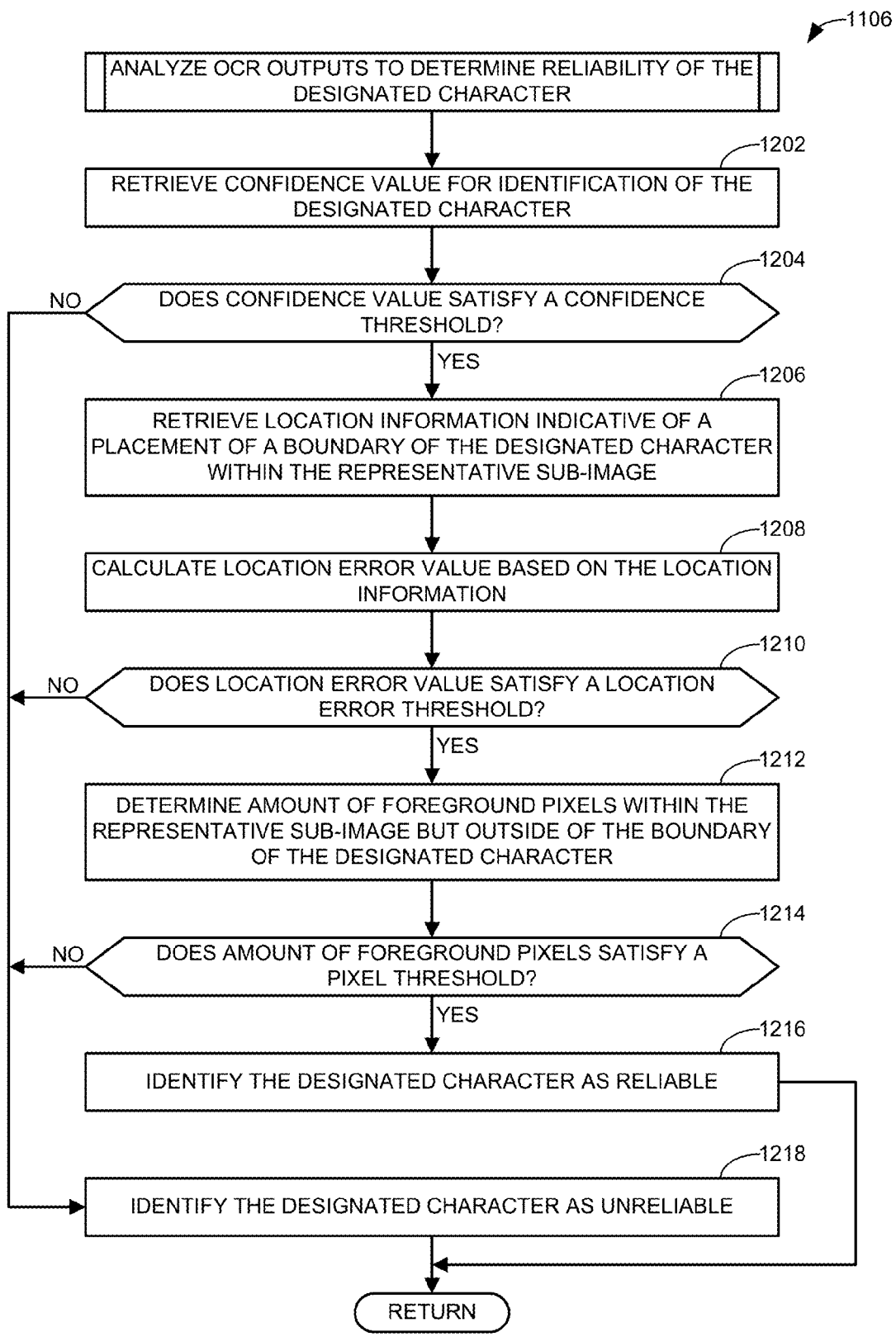
Figure 13:
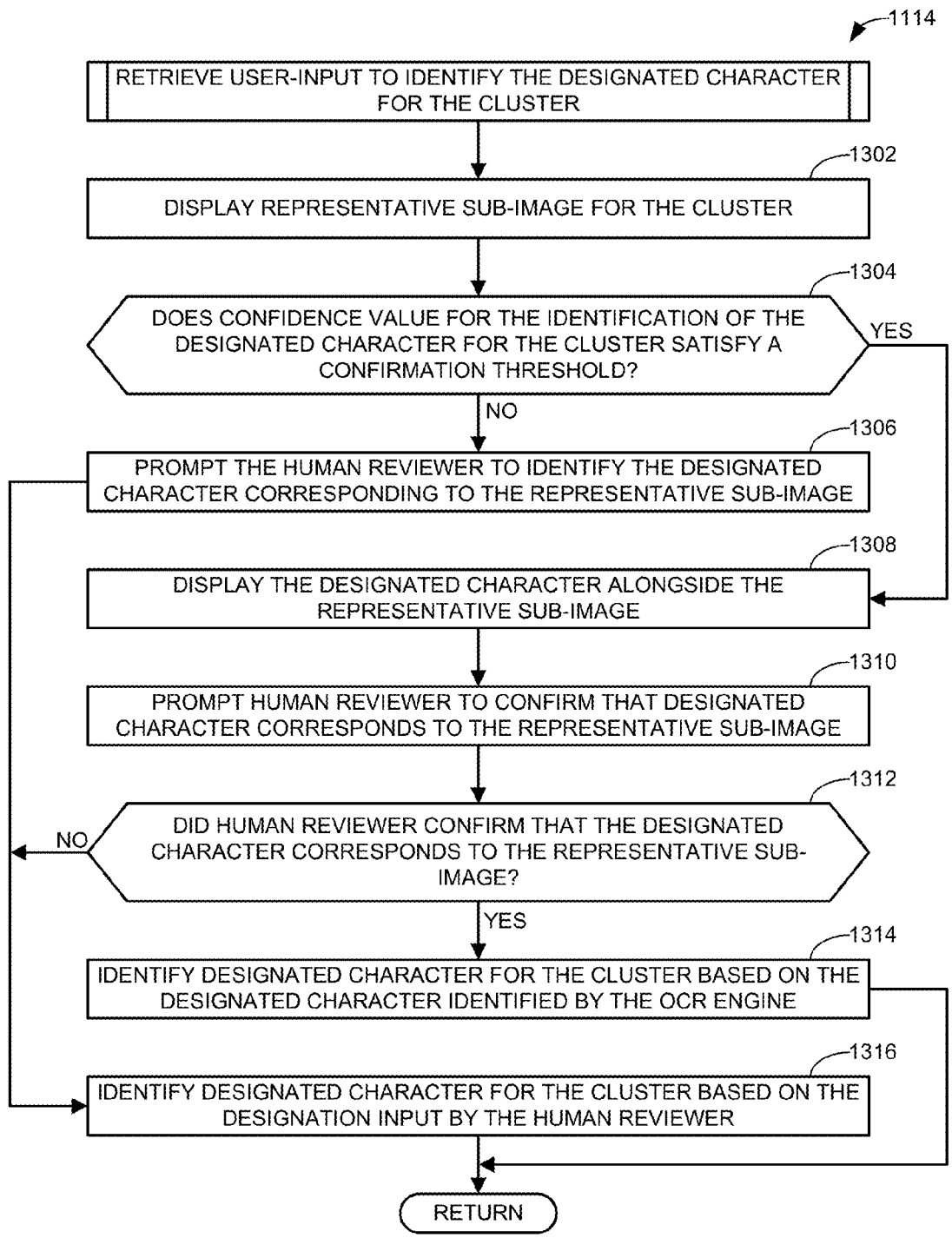

As mentioned above, FIG. 12 illustrates an example program to implement block 1106 of FIG. 11 to analyze OCR outputs to determine a reliability of a designated character. The example program begins at block 1202 where the example character identifier 208 retrieves a confidence value for the identification of the designated character. At block 1204, the example character identifier 208 determines whether the confidence value satisfies (e.g., is greater than or equal to) a confidence threshold. If not, control advances to block 1218 where the example character identifier 208 identifies the designated character as unreliable before returning to complete the example program of FIG. 11. If the example character identifier 208 determines that the confidence value does satisfy the confidence threshold, control advances to block 1206.

At block 1206, the example character identifier 208 retrieves location information indicative of a placement of a boundary of the designated character within the representative sub-image. At block 1208, the example character identifier 208 calculates a location error value based on the location information. At block 1210, the example character identifier 208 determines whether the location error value satisfies (e.g., is less than) a location error threshold. If not, control advances to block 1218 where the example character identifier 208 identifies the designated character as unreliable before returning to complete the example program of FIG. 11. If the example character identifier 208 determines that the location error value does satisfy the location error threshold, control advances to block 1212.

At block 1212, the example character identifier 208 determines an amount of foreground pixels within the representative sub-image but outside of the boundary of the designated character. At block 1214, the example character identifier 208 determines whether the amount of foreground pixels satisfies (e.g., is less than) a pixel threshold. If not, control advances to block 1218 where the example character identifier 208 identifies the designated character as unreliable before returning to complete the example program of FIG. 11. If the example character identifier 208 determines that the amount of foreground pixels does satisfy the pixel threshold (block 1214), control advances to block 1216 where the example character identifier 208 identifies the designated character as reliable before returning to complete the example program of FIG. 11.

As mentioned above, FIG. 13 illustrates an example program to implement block 1114 of FIG. 11 to retrieve user-input to identify a designated character for a cluster. The example program begins at block 1302 where the example user interface 210 displays the representative sub-image for the cluster. At block 1304, the example character identifier 208 determines whether the confidence value (e.g., output by an OCR engine) for the identification of the designated character for the cluster satisfies (e.g., is greater than or equal to) a confirmation threshold. In some examples, the confirmation threshold is lower than the confidence threshold (above which a designated character is identified as reliable) but sufficiently high such that there is still a reasonable likelihood that the designated character is correct. In some such examples, the designated character is assumed to be accurate but a human reviewer is relied on to confirm the designation. For example, the confidence threshold may be set to 0.85 while the confirmation threshold is set to 0.7. In some examples, a confidence value below the confirmation threshold is sufficiently unreliable such that a human reviewer is relied on to identify the correct designated character without being presented with the unreliable designated character identified by the OCR engine.

Accordingly, if the example character identifier 208 determines that the confidence value for the identification of the designated character for the cluster satisfies the confirmation threshold (block 1304), control advances to block 1308. At block 1308, the user interface 210 displays the designated character alongside the representative sub-image. At block 1310, the example character identifier 208 prompts a human reviewer to confirm that the designated character corresponds to the representative sub-image. In some examples, the human reviewer may confirm the designated character by taking a particular action (e.g., an enter key or the space bar on a keyboard). By having a particular action for a reviewer to take when confirming a designated character in this manner can increase the efficiency of the reviewer. For example, most designated characters to be confirmed by the human reviewer are likely to be correct because their confidence values are relatively high (above the confirmation threshold). As such, the human reviewer needs to only perform that confirmation action (e.g., hitting the space bar) without further effort. On the off chance that the designated character is incorrect, the reviewer may have to take additional steps (e.g., specify the correct character) but this will occur a minority of the time because of the relatively high confidence values (above the confirmation threshold).

At block 1312, the example character identifier 208 determines whether the human reviewer confirmed that the designated character corresponds to the representative sub-image. If so, control advances to block 1314 where the example character identifier 208 identifies the designated character for the cluster based on the designated character identified by the OCR engine, whereupon control returns to complete the example program of FIG. 11. If the example character identifier 208 determines that the human reviewer did not confirm that the designated character corresponds to the representative sub-image (block 1312), control advances to block 1316 where the example character identifier 208 identifies the designated character for the cluster based on a designation input by the human reviewer. That is, if the designated character as determined by the OCR engine is incorrect such that the human reviewer will not confirm such, the human reviewer may enter the correct character corresponding to the representative sub-image, which is then used as the designated character for the cluster. Thereafter, the example program of FIG. 13 ends and returns to complete the example program of FIG. 11.

Returning to block 1304, if the example character identifier 208 determines that the confidence value for the identification of the designated character for the cluster is not above the confirmation threshold, control advances to block 1306. At block 1306, the example character identifier 208 prompts the human reviewer to identify the designated character corresponding to the representative sub-image. Control then advances to block 1316 where the example character identifier 208 identifies the designated character for the cluster based on the designation input by the human reviewer before the example program of FIG. 13 ends and returns to complete the example program of FIG. 11.

Figure 14:
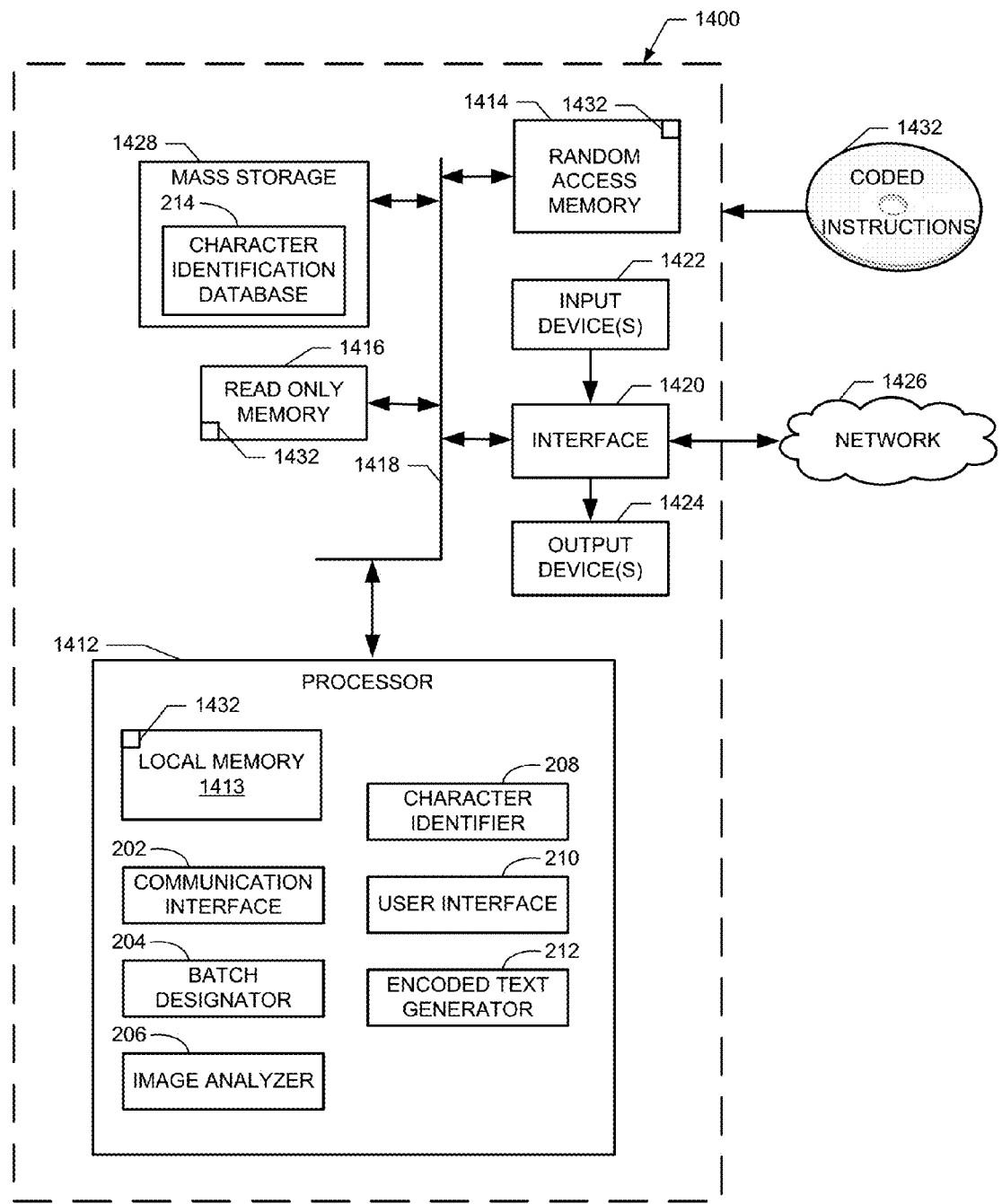
FIG. 14 is a block diagram of an example processor platform structured to execute the example machine readable instructions of FIGS. 8-13 to implement the example data processing facility of FIGS. 1 and/or 2.

FIG. 14 is a block diagram of an example processor platform 1400 capable of executing the instructions of FIGS. 8-13 to implement the example data processing facility 110 of FIGS. 1 and/or 2. The processor platform 1400 can be, for example, a server, a personal computer, a mobile device (e.g., a cell phone, a smart phone, a tablet such as an iPad™), a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). In the illustrated example, the processor 1412 implements the example communication interface 202, the example batch designator 204, the example image analyzer 206, the example character identifier 208, the example user interface 210, and/or the example encoded text generator 212 of FIG. 2. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. For example, the mass storage device 1428 may include the example character identification database 214. Examples of such mass storage devices 1428 include floppy disk drives, hard drive disks, compact disk drives, Blu-ray disk drives, RAID systems, and digital versatile disk (DVD) drives.

The coded instructions 1432 of FIGS. 8-13 may be stored in the mass storage device 1428, in the volatile memory 1414, in the non-volatile memory 1416, and/or on a removable tangible computer readable storage medium such as a CD or DVD.

From the foregoing, it will be appreciated that the above disclosed example methods and apparatus substantially increase the efficiency of text extraction when accomplished strictly with a human reviewer as well as when performed using OCR techniques. More particularly, examples disclosed herein enable text extraction to take advantage of economies of scale by using a single designation of a character for an entire cluster of similar characters. Moreover, the clusters of characters recognized at a single time (by either a human reviewer or an OCR engine) can be generated from the characters in a single document or from a batch of multiple documents. Further still, once a human reviewer has identified a particular character that could not be reliably identified by an OCR engine, the character designation may be stored for reference whenever a similarly appearing character is analyzed such that the automatic designation of the character can be accomplished without the need for the human reviewer to identify the character a second time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   segmenting, by executing an instruction with a processor, an image of a document into localized sub-images corresponding to individual characters in the document;
   grouping, by executing an instruction with the processor, respective ones of the sub-images into a cluster based on visual correlations of the respective ones of the sub-images to a reference sub-image, the visual correlations between the reference sub-image and the respective ones of the sub-images grouped into the cluster exceeding a correlation threshold;
   identifying, by executing an instruction with the processor, a designated character for one representative sub-image associated with the cluster;
   assigning, by executing an instruction with the processor, the designated character to the respective ones of the sub-images grouped into the cluster; and
   associating, by executing an instruction with the processor, the designated character with locations in the image of the document associated with the respective ones of the sub-images grouped into the cluster.

2. The method of claim 1, wherein the designated character is identified without using an optical character recognition engine.

3. The method of claim 1, further including identifying the designated character for the representative sub-image by:
   presenting the representative sub-image associated with the cluster to a human reviewer; and
   receiving feedback from the human reviewer indicating the designated character.

4. The method of claim 1, wherein the designated character is identified based on optical character recognition of the representative sub-image associated with the cluster.

5. The method of claim 4, wherein the representative sub-image corresponds to a first one of the sub-images grouped into the cluster.

6. The method of claim 4, wherein the representative sub-image is a composite of the respective ones of the sub-images grouped into the cluster.

7. A method comprising:
   segmenting, by executing an instruction with a processor, an image of a document into localized sub-images corresponding to individual characters in the document;
   grouping, by executing an instruction with the processor, respective ones of the sub-images into a cluster based on visual correlations of the respective ones of the sub-images to a reference sub-image, the visual correlations between the reference sub-image and the respective ones of the sub-images grouped into the cluster exceeding a correlation threshold;
   identifying, by executing an instruction with the processor, a designated character for the cluster based on the sub-images grouped into the cluster; and
   associating, by executing an instruction with the processor, the designated character with locations in the image of the document associated with the respective ones of the sub-images grouped into the cluster, the method further including determining the visual correlation of a first one of the sub-images to the reference sub-image by:
   transforming the first one of the sub-images to have a spatial orientation corresponding to the reference sub-image to determine a transformed sub-image;
   adding a margin around the transformed sub-image;
   calculating a correlation value between the transformed sub-image and the reference sub-image for different positions of the reference sub-image relative to the transformed sub-image within a boundary defined by the margin; and
   assigning a largest one of the correlation values as the visual correlation of the first one of the sub-images to the reference sub-image.

8. The method of claim 1, further including:
determining a reliability of the designated character based on an output of an optical character recognition analysis of the representative sub-image for the cluster; and
automatically assigning the designated character to the respective ones of the sub-images grouped into the cluster when the designated character is determined to be reliable.

9. The method of claim 8, further including:
comparing the representative sub-image to a stored sub-image associated with a stored designated character previously verified by a human reviewer when the designated character is determined to be unreliable; and
automatically assigning the stored designated character as the designated character when a visual correlation between the representative sub-image and the stored sub-image exceeds the correlation threshold.

10. The method of claim 8, further including prompting a human reviewer for verification of the designated character when the designated character is determined to be unreliable.

11. The method of claim 10, wherein the designated character is determined to be unreliable when a location error value generated by the optical character recognition analysis of the representative sub-image for the cluster does not satisfy a location error threshold, the location error value corresponding to a difference between a location of a boundary of the designated character identified within the representative sub-image and a boundary of the representative sub-image.

12. The method of claim 10, wherein the designated character is determined to be unreliable when a confidence value generated by the optical character recognition analysis does not satisfy a confidence threshold.

13. The method of claim 12, wherein prompting the human reviewer for verification of the designated character includes:
when the confidence value does not satisfy the confidence threshold and satisfies a confirmation threshold, displaying the designated character alongside the representative sub-image and requesting the human reviewer to confirm the designated character corresponds to the representative sub-image, and
when the confidence value does not satisfy the confirmation threshold, displaying the representative sub-image and requesting the human reviewer to identify the representative sub-image.

14. A method comprising:
segmenting, by executing an instruction with a processor, an image of a document into localized sub-images corresponding to individual characters in the document;
grouping, by executing an instruction with the processor, respective ones of the sub-images into a cluster based on visual correlations of the respective ones of the sub-images to a reference sub-image, the visual correlations between the reference sub-image and the respective ones of the sub-images grouped into the cluster exceeding a correlation threshold;
identifying, by executing an instruction with the processor, a designated character for the cluster based on the sub-images grouped into the cluster; and
associating, by executing an instruction with the processor, the designated character with locations in the image of the document associated with the respective ones of the sub-images grouped into the cluster, the method further including:
determining, by executing an instruction with the processor, a reliability of the designated character based on an output of an optical character recognition analysis of a representative sub-image for the cluster;
automatically assigning, by executing an instruction with the processor, the designated character to the cluster when the designated character is determined to be reliable; and
prompting, by executing an instruction with the processor, a human reviewer for verification of the designated character when the designated character is determined to be unreliable, wherein the designated character is determined to be unreliable when an amount of foreground pixels within the representative sub-image and outside a boundary of the designated character identified within the representative sub-image does not satisfy a pixel threshold.

15. An apparatus comprising:
an image analyzer, implemented via a processor, to segment an image of a document into localized sub-images corresponding to individual characters in the document, and group respective ones of the sub-images into a cluster based on visual correlations of the respective ones of the sub-images to a reference sub-image, the visual correlations between the reference sub-image and the respective ones of the sub-images grouped into the cluster exceeding a correlation threshold;
a character identifier, implemented via the processor, to identify a designated character for one representative sub-image associated with the cluster and assign the designated character to the respective ones of the sub-images grouped into the cluster; and
an encoded text generator, implemented via the processor, to associate the designated character with locations in the image of the document associated with the respective ones of the sub-images grouped into the cluster.

16. The apparatus of claim 15, wherein the character identifier is to:
determine a reliability of the designated character based on an output of an optical character recognition analysis of the representative sub-image for the cluster; and
automatically assign the designated character to the respective ones of the sub-images grouped into the cluster when the designated character is determined to be reliable.

17. The apparatus of claim 16, wherein the character identifier is to prompt a human reviewer for verification of the designated character when the designated character is determined to be unreliable.

18. A non-transitory computer readable medium comprising instructions that, when executed, cause a machine to at least:
segment an image of a document into localized sub-images corresponding to individual characters in the document;
group respective ones of the sub-images into a cluster based on visual correlations of the respective ones of the sub-images to a reference sub-image, the visual correlations between the reference sub-image and the respective ones of the sub-images grouped into the cluster exceeding a correlation threshold;
identify a designated character for one representative sub-image associated with the cluster;
assign the designated character to the respective ones of the sub-images grouped into the cluster; and associate the designated character with locations in the image of the document associated with the respective ones of the sub-images grouped into the cluster.

19. The non-transitory computer readable medium of claim 18, wherein the instructions further cause the machine to:
   determine a reliability of the designated character based on an output of an optical character recognition analysis of the representative sub-image for the cluster; and
   automatically assign the designated character to the respective ones of the sub-images grouped into the cluster when the designated character is determined to be reliable.

20. The non-transitory computer readable medium of claim 19, wherein the instructions further cause the machine to prompt a human reviewer for verification of the designated character when the designated character is determined to be unreliable.

* * * * *